(12) United States Patent
Fujita et al.

(10) Patent No.: US 10,668,980 B2
(45) Date of Patent: Jun. 2, 2020

(54) BICYCLE REAR SPROCKET ASSEMBLY

(71) Applicant: SHIMANO INC., Sakai (JP)

(72) Inventors: Hiroshi Fujita, Sakai (JP); Atsuhiro Emura, Sakai (JP)

(73) Assignee: SHIMANO INC., Sakai (JP)

(*) Notice: Subject to any disclaimer, the term of this patent is extended or adjusted under 35 U.S.C. 154(b) by 230 days.

(21) Appl. No.: 15/686,117

(22) Filed: Aug. 24, 2017

(65) Prior Publication Data
US 2019/0061874 A1  Feb. 28, 2019

(51) Int. Cl.
*B62M 9/10* (2006.01)
*B60B 27/04* (2006.01)
*B60B 27/02* (2006.01)
*F16H 55/30* (2006.01)

(52) U.S. Cl.
CPC ............. *B62M 9/10* (2013.01); *B60B 27/04* (2013.01); *B60B 27/047* (2013.01); *F16H 55/30* (2013.01); *B60B 27/023* (2013.01)

(58) Field of Classification Search
CPC ..... B60B 27/023; B60B 27/04; B60B 27/047; B62M 9/10; F16H 55/30
See application file for complete search history.

(56) References Cited

U.S. PATENT DOCUMENTS

| | | | | |
|---|---|---|---|---|
| 5,194,051 A * | 3/1993 | Nagano | ................... | B62M 9/10 474/160 |
| 9,511,819 B1 * | 12/2016 | Watarai | ................... | F16H 55/30 |
| 2009/0098966 A1 * | 4/2009 | Kamada | ................... | B62M 9/10 474/160 |
| 2013/0035183 A1 * | 2/2013 | Tokuyama | ............... | B62M 9/10 474/78 |
| 2016/0114859 A1 * | 4/2016 | Tsai | ......................... | B62M 9/10 474/160 |
| 2016/0121965 A1 * | 5/2016 | Tsai | ......................... | B62M 9/10 264/263 |
| 2016/0347410 A1 | 12/2016 | Watarai et al. | | |
| 2018/0022415 A1 * | 1/2018 | Oishi | ....................... | B62M 9/10 474/160 |
| 2018/0237103 A1 * | 8/2018 | Fujita | ....................... | F16H 55/30 |
| 2018/0281898 A1 * | 10/2018 | Iwai | ........................ | B62M 9/10 |
| 2018/0283520 A1 * | 10/2018 | Iwai | ........................ | F16H 55/12 |
| 2018/0297664 A1 * | 10/2018 | Fukumori | ............... | F16H 55/30 |

(Continued)

FOREIGN PATENT DOCUMENTS

| | | |
|---|---|---|
| CN | 203740093 U | 7/2014 |
| CN | 106184594 | 12/2016 |

*Primary Examiner* — Michael R Mansen
*Assistant Examiner* — Juan J Campos, Jr.
(74) *Attorney, Agent, or Firm* — Mori & Ward, LLP

(57) ABSTRACT

A bicycle rear sprocket assembly comprises a first sprocket, a second sprocket, and a sprocket support. The first sprocket includes a first sprocket body and a plurality of first sprocket teeth. The first sprocket body has at least one first recess. The second sprocket includes a second sprocket body and a plurality of second sprocket teeth. The sprocket support is configured to engage with a bicycle hub assembly. The sprocket support includes a sprocket attachment part. The first sprocket and the second sprocket are attached to the sprocket attachment part. The sprocket attachment part is at least partly provided in the at least one first recess to transmit a rotational force between the first sprocket and the sprocket support.

30 Claims, 44 Drawing Sheets

(56) References Cited

U.S. PATENT DOCUMENTS

2018/0346064 A1\* 12/2018 Fujita ........................ B62M 9/10
2018/0346065 A1\* 12/2018 Fujita ........................ B62M 9/10
2019/0047324 A1\*  2/2019 Fujita ...................... B60B 27/04

\* cited by examiner

BICYCLE REAR SPROCKET ASSEMBLY

BACKGROUND OF THE INVENTION

Field of the Invention

The present invention relates to a bicycle rear sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket assembly.

SUMMARY OF THE INVENTION

In accordance with a first aspect of the present invention, a bicycle rear sprocket assembly comprises a first sprocket, a second sprocket, and a sprocket support. The first sprocket includes a first sprocket body and a plurality of first sprocket teeth extending radially outwardly from the first sprocket body with respect to a rotational center axis of the bicycle rear sprocket assembly. The first sprocket body has at least one first recess. The second sprocket includes a second sprocket body and a plurality of second sprocket teeth extending radially outwardly from the second sprocket body with respect to the rotational center axis. The sprocket support is configured to engage with a bicycle hub assembly. The sprocket support includes a sprocket attachment part. The first sprocket and the second sprocket are attached to the sprocket attachment part. The sprocket attachment part is at least partly provided in the at least one first recess to transmit a rotational force between the first sprocket and the sprocket support.

With the bicycle rear sprocket assembly according to the first aspect, it is possible to maintain or improve coupling strength between the first sprocket and the sprocket support with a simple structure.

In accordance with a second aspect of the present invention, the bicycle rear sprocket assembly according to the first aspect is configured so that the at least one first recess includes a first circumferential surface and a first additional circumferential surface spaced apart from the first circumferential surface in a circumferential direction with respect to the rotational center axis. The sprocket attachment part is provided between the first circumferential surface and the first additional circumferential surface in the circumferential direction.

With the bicycle rear sprocket assembly according to the second aspect, it is possible to maintain or improve coupling strength between the first sprocket and the sprocket support with a simple structure.

In accordance with a third aspect of the present invention, the bicycle rear sprocket assembly according to the second aspect is configured so that the at least one first recess includes a first axial surface facing in an axial direction with respect to the rotational center axis. The first axial surface is provided between the first circumferential surface and the first additional circumferential surface in the circumferential direction. The sprocket attachment part at least partly faces the first axial surface in the axial direction.

With the bicycle rear sprocket assembly according to the third aspect, it is possible to increase an area of a surface coupling the first sprocket to the sprocket support.

In accordance with a fourth aspect of the present invention, the bicycle rear sprocket assembly according to the second or third aspect is configured so that the first circumferential surface and the first additional circumferential surface face toward each other in the circumferential direction.

With the bicycle rear sprocket assembly according to the fourth aspect, it is possible to maintain or improve coupling strength between the first sprocket and the sprocket support in the circumferential direction with a simple structure.

In accordance with a fifth aspect of the present invention, the bicycle rear sprocket assembly according to the fourth aspect is configured so that the sprocket attachment part includes a radially outer end provided between the first circumferential surface and the first additional circumferential surface in the circumferential direction.

With the bicycle rear sprocket assembly according to the fifth aspect, it is possible to effectively maintain or improve coupling strength between the first sprocket and the sprocket support in the circumferential direction with a simple structure.

In accordance with a sixth aspect of the present invention, the bicycle rear sprocket assembly according to any one of the first to fifth aspects is configured so that at least one of the first sprocket and the second sprocket is attached to the sprocket attachment part by adhesive.

With the bicycle rear sprocket assembly according to the sixth aspect, it is possible to save weight of the bicycle rear sprocket assembly with maintaining or improving coupling strength between the sprocket support and the at least one of the first sprocket and the second sprocket.

In accordance with a seventh aspect of the present invention, the bicycle rear sprocket assembly according to any one of the first to sixth aspects is configured so that the sprocket support includes a hub engagement part configured to engage with the bicycle hub assembly. The sprocket attachment part includes a plurality of support arms extending radially outwardly from the hub engagement part. The first sprocket and the second sprocket are attached to the plurality of support arms.

With the bicycle rear sprocket assembly according to the seventh aspect, it is possible to save weight of the sprocket support.

In accordance with an eighth aspect of the present invention, the bicycle rear sprocket assembly according to the seventh aspect is configured so that at least one arm of the plurality of support arms includes a first radial support surface and a first axial support surface. The first radial support surface faces radially outwardly. The first axial support surface faces in the axial direction. The first sprocket is attached to at least one of the first radial support surface and the first axial support surface.

With the bicycle rear sprocket assembly according to the eighth aspect, it is possible to increase an area of a surface coupling the first sprocket to the sprocket support.

In accordance with a ninth aspect of the present invention, the bicycle rear sprocket assembly according to any one of the first to eighth aspects is configured so that the sprocket support includes a first radial support surface and a first axial support surface. The first radial support surface faces radially outwardly. The first axial support surface faces in the axial direction. The first sprocket is attached to at least one of the first radial support surface and the first axial support surface.

With the bicycle rear sprocket assembly according to the ninth aspect, it is possible to increase an area of a surface coupling the first sprocket to the sprocket support.

In accordance with a tenth aspect of the present invention, the bicycle rear sprocket assembly according to the eighth or ninth aspect is configured so that the first axial support surface is provided in the at least one first recess.

With the bicycle rear sprocket assembly according to the tenth aspect, it is possible to effectively maintain or improve coupling strength between the first sprocket and the second sprocket with a simple structure.

In accordance with an eleventh aspect of the present invention, the bicycle rear sprocket assembly according to any one of the eighth to tenth aspects is configured so that the at least one arm of the plurality of support arms includes a second radial support surface and a second axial support surface. The second radial support surface faces radially outwardly. The second axial support surface faces in the axial direction. The second sprocket is attached to at least one of the second radial support surface and the second axial support surface.

With the bicycle rear sprocket assembly according to the eleventh aspect, it is possible to increase an area of a surface coupling the second sprocket to the sprocket support.

In accordance with a twelfth aspect of the present invention, the bicycle rear sprocket assembly according to any one of the seventh to eleventh aspects is configured so that at least one arm of the plurality of support arms includes a radially outer end provided in the at least one first recess.

With the bicycle rear sprocket assembly according to the twelfth aspect, it is possible to effectively maintain or improve coupling strength between the first sprocket and the sprocket support in the circumferential direction with a simple structure.

In accordance with a thirteenth aspect of the present invention, the bicycle rear sprocket assembly according to any one of the first to twelfth aspects is configured so that the first sprocket is made of a first metallic material.

With the bicycle rear sprocket assembly according to the thirteenth aspect, it is possible to improve strength of the first sprocket.

In accordance with a fourteenth aspect of the present invention, the bicycle rear sprocket assembly according to the thirteenth aspect is configured so that the first metallic material includes aluminum.

With the bicycle rear sprocket assembly according to the fourteenth aspect, it is possible to improve strength of the first sprocket with saving weight of the first sprocket.

In accordance with a fifteenth aspect of the present invention, the bicycle rear sprocket assembly according to any one of the first to fourteenth aspects is configured so that the first sprocket has a first pitch-circle diameter. The second sprocket has a second pitch-circle diameter. The first pitch-circle diameter is larger than the second pitch-circle diameter.

With the bicycle rear sprocket assembly according to the fifteenth aspect, it is possible to maintain or improve coupling strength between the first sprocket having a larger pitch-circle diameter and the sprocket support with a simple structure.

In accordance with a sixteenth aspect of the present invention, the bicycle rear sprocket assembly according to the fifteenth aspect is configured so that the first pitch-circle diameter is the largest pitch-circle diameter in the bicycle rear sprocket assembly.

With the bicycle rear sprocket assembly according to the sixteenth aspect, it is possible to maintain or improve coupling strength between the first sprocket having the largest pitch-circle diameter and the sprocket support with a simple structure.

In accordance with a seventeenth aspect of the present invention, the bicycle rear sprocket assembly according to any one of the first to sixteenth aspects is configured so that the sprocket support includes a hub engagement part configured to engage with the bicycle hub assembly. The hub engagement part includes an internal spline.

With the bicycle rear sprocket assembly according to the seventeenth aspect, it is possible to mount the bicycle rear sprocket assembly to the bicycle hub assembly having an external spline.

In accordance with an eighteenth aspect of the present invention, the bicycle rear sprocket assembly according to any one of the first to seventeenth aspect further comprises a third sprocket and a fourth sprocket. The third sprocket includes a third sprocket body and a plurality of third sprocket teeth extending radially outwardly from the third sprocket body with respect to the rotational center axis. The fourth sprocket includes a fourth sprocket body and a plurality of fourth sprocket teeth extending radially outwardly from the fourth sprocket body with respect to the rotational center axis.

With the bicycle rear sprocket assembly according to the eighteenth aspect, it is possible to mount the third sprocket and the fourth sprocket to the sprocket support in addition to the first sprocket and the second sprocket.

In accordance with a nineteenth aspect of the present invention, the bicycle rear sprocket assembly according to the eighteenth aspect is configured so that the third sprocket and the fourth sprocket are attached to the sprocket attachment part.

With the bicycle rear sprocket assembly according to the nineteenth aspect, it is possible to effectively mount the third sprocket and the fourth sprocket to the sprocket support in addition to the first sprocket and the second sprocket.

In accordance with a twentieth aspect of the present invention, the bicycle rear sprocket assembly according to any one of the first to nineteenth aspects is configured so that the first sprocket is adjacent to the second sprocket without another sprocket between the first sprocket and the second sprocket in an axial direction with respect to the rotational center axis.

With the bicycle rear sprocket assembly according to the twentieth aspect, it is possible to maintain or improve coupling strength between each of the first sprocket and the second sprocket and the sprocket support with a simple structure.

In accordance with a twenty-first aspect of the present invention, the bicycle rear sprocket assembly according to any one of the first to twentieth aspects is configured so that the second sprocket body has at least one second recess. The sprocket attachment part is at least partly provided in the at least one second recess.

With the bicycle rear sprocket assembly according to the twenty-first aspect, it is possible to maintain or improve coupling strength between the second sprocket and the sprocket support with a simple structure.

In accordance with a twenty-second aspect of the present invention, the bicycle rear sprocket assembly according to any one of the first to twenty-first aspects is configured so that the first sprocket body includes a first support attachment part having the at least one first recess. The first support attachment part has a first axial thickness defined in an axial direction with respect to the rotational center axis.

The at least one first recess has a first axial depth defined in the axial direction. The first axial thickness is larger than the first axial depth.

With the bicycle rear sprocket assembly according to the twenty-second aspect, it is possible to maintain strength of the first sprocket with maintaining or improving coupling strength between the first sprocket and the sprocket support.

In accordance with a twenty-third aspect of the present invention, the bicycle rear sprocket assembly according to any one of the first to twenty-second aspects is configured so that the sprocket support includes a hub engagement part configured to engage with the bicycle hub assembly. The sprocket attachment part includes a plurality of support arms extending radially outwardly from the hub engagement part. At least one arm of the plurality of support arms includes a first wall, a second wall, and an attachment wall. The first wall is spaced apart from the second wall in a circumferential direction with respect to the rotational center axis. The first wall and the second wall extends from the attachment wall in an axial direction with respect to the rotational center axis. The first sprocket and the second sprocket are attached to the attachment wall.

With the bicycle rear sprocket assembly according to the twenty-third aspect, it is possible to maintain or improve strength of the sprocket support with saving weight of the sprocket support.

In accordance with a twenty-fourth aspect of the present invention, the bicycle rear sprocket assembly according to the twenty-third aspect is configured so that the first wall includes a first reinforcement part having at least one of a first maximum circumferential thickness defined in the circumferential direction and a first maximum axial thickness defined in the axial direction.

With the bicycle rear sprocket assembly according to the twenty-fourth aspect, it is possible to effectively maintain or improve strength of the sprocket support with saving weight of the sprocket support.

In accordance with a twenty-fifth aspect of the present invention, the bicycle rear sprocket assembly according to the twenty-fourth aspect is configured so that the first reinforcement part is provided closer to an axial end of the first wall than the attachment wall in the axial direction.

With the bicycle rear sprocket assembly according to the twenty-fifth aspect, it is possible to effectively maintain or improve strength of the sprocket support with saving weight of the sprocket support.

In accordance with a twenty-sixth aspect of the present invention, the bicycle rear sprocket assembly according to the twenty-fifth aspect is configured so that at least one of the first maximum circumferential thickness and the first maximum axial thickness is defined at an axially end part of the first reinforcement part.

With the bicycle rear sprocket assembly according to the twenty-sixth aspect, it is possible to effectively maintain or improve strength of the sprocket support with saving weight of the sprocket support.

In accordance with a twenty-seventh aspect of the present invention, the bicycle rear sprocket assembly according to any one of the twenty-fourth to twenty-sixth aspects is configured so that the first reinforcement part is provided radially closer to the hub engagement part than a radially outer end of the at least one arm of the plurality of support arms.

With the bicycle rear sprocket assembly according to the twenty-seventh aspect, it is possible to effectively maintain or improve strength of the sprocket support with saving weight of the sprocket support.

In accordance with a twenty-eighth aspect of the present invention, the bicycle rear sprocket assembly according to the twenty-seventh aspect is configured so that the first reinforcement part has at least one of a first maximum circumferential thickness defined in the circumferential direction and a first maximum axial thickness defined in the axial direction. The at least one of first maximum circumferential thickness and the first maximum axial thickness is defined at a radially inner part of the first reinforcement part.

With the bicycle rear sprocket assembly according to the twenty-eighth aspect, it is possible to effectively maintain or improve strength of the sprocket support with saving weight of the sprocket support.

In accordance with a twenty-ninth aspect of the present invention, the bicycle rear sprocket assembly according to any one of the first to twenty-eighth aspects is configured so that the at least one first recess includes a first circumferential width. The plurality of first sprocket teeth is arranged at a tooth pitch in a circumferential direction with respect to the rotational center axis. The first circumferential width is larger than the tooth pitch.

With the bicycle rear sprocket assembly according to the twenty-ninth aspect, it is possible to effectively maintain or improve coupling strength between the first sprocket and the sprocket support with a simple structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
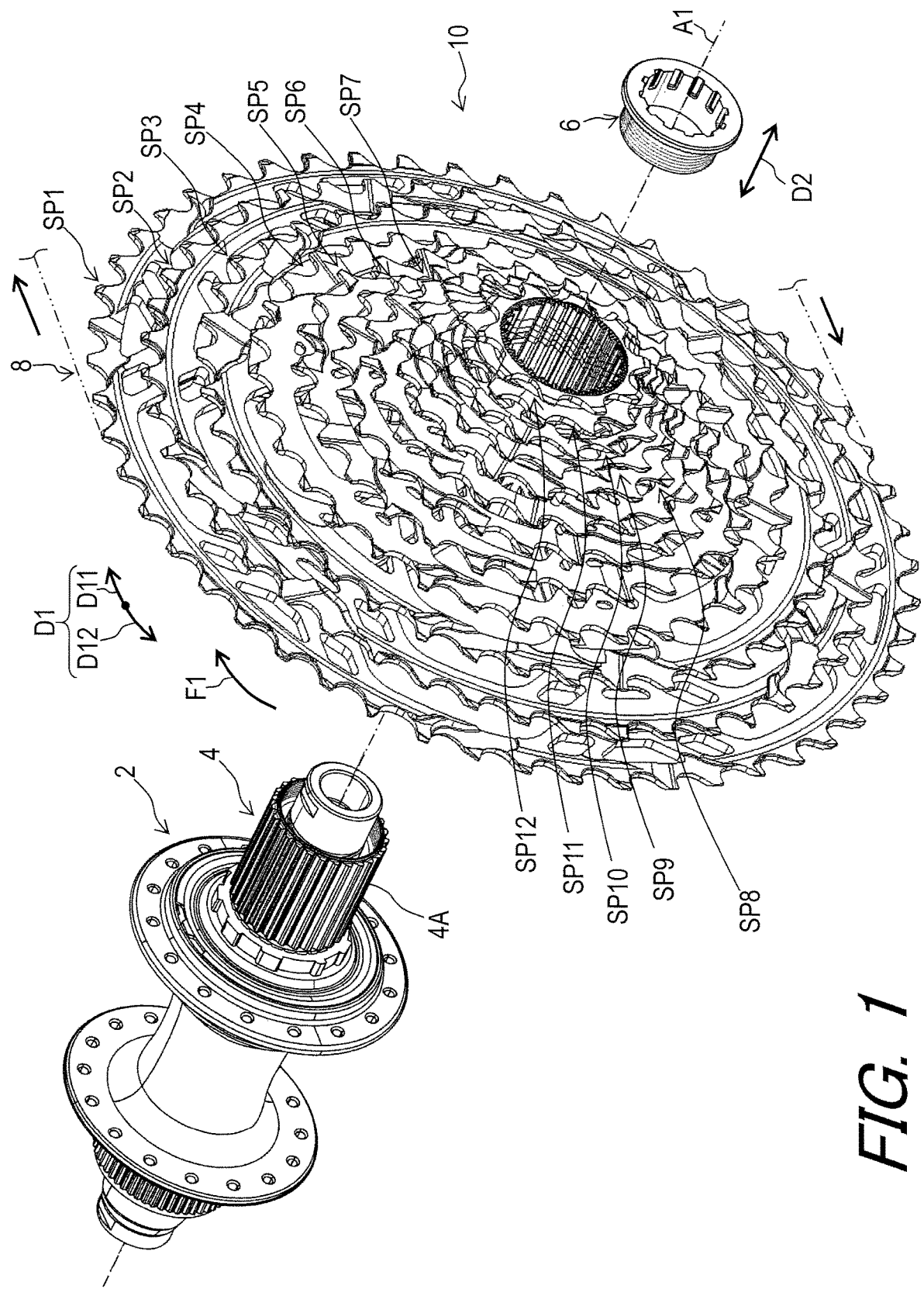
FIG. 1 is a perspective view of a bicycle rear sprocket assembly in accordance with a first embodiment, with a bicycle hub assembly and a lock ring.

The embodiment(s) will now be described with reference to the accompanying drawings, wherein like reference numerals designate corresponding or identical elements throughout the various drawings.

Referring initially to FIG. 1, a bicycle rear sprocket assembly 10 in accordance with an embodiment comprises a first sprocket SP1 and a second sprocket SP2. In this embodiment, the bicycle rear sprocket assembly 10 further comprises a third sprocket SP3 and a fourth sprocket SP4. The bicycle rear sprocket assembly 10 further comprises a fifth sprocket SP5, a sixth sprocket SP6, a seventh sprocket SP7, an eighth sprocket SP8, a ninth sprocket SP9, a tenth sprocket SP10, an eleventh sprocket SP11, and a twelfth sprocket SP12. However, a total number of sprockets of the bicycle rear sprocket assembly 10 is not limited to this embodiment.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle rear sprocket assembly 10, should be interpreted relative to the bicycle equipped with the bicycle rear sprocket assembly 10 as used in an upright riding position on a horizontal surface.

As seen in FIG. 1, the bicycle rear sprocket assembly 10 has a rotational center axis A1. The bicycle rear sprocket assembly 10 is rotatably supported by a bicycle hub assembly 2 relative to a bicycle frame (not shown) about the rotational center axis A1. The bicycle rear sprocket assembly 10 is secured to a sprocket support body 4 of the bicycle hub assembly 2 with a lock ring 6. The bicycle rear sprocket assembly 10 is configured to be engaged with a bicycle chain 8 to transmit a driving rotational force F1 between the bicycle chain 8 and the bicycle rear sprocket assembly 10 during pedaling. The bicycle rear sprocket assembly 10 is rotated about the rotational center axis A1 in a driving rotational direction D11 during pedaling. The driving rotational direction D11 is defined along a circumferential direction D1 of the bicycle hub assembly 2 or the bicycle rear sprocket assembly 10. A reverse rotational direction D12 is an opposite direction of the driving rotational direction D11 and is defined along the circumferential direction D1.

Figure 2:
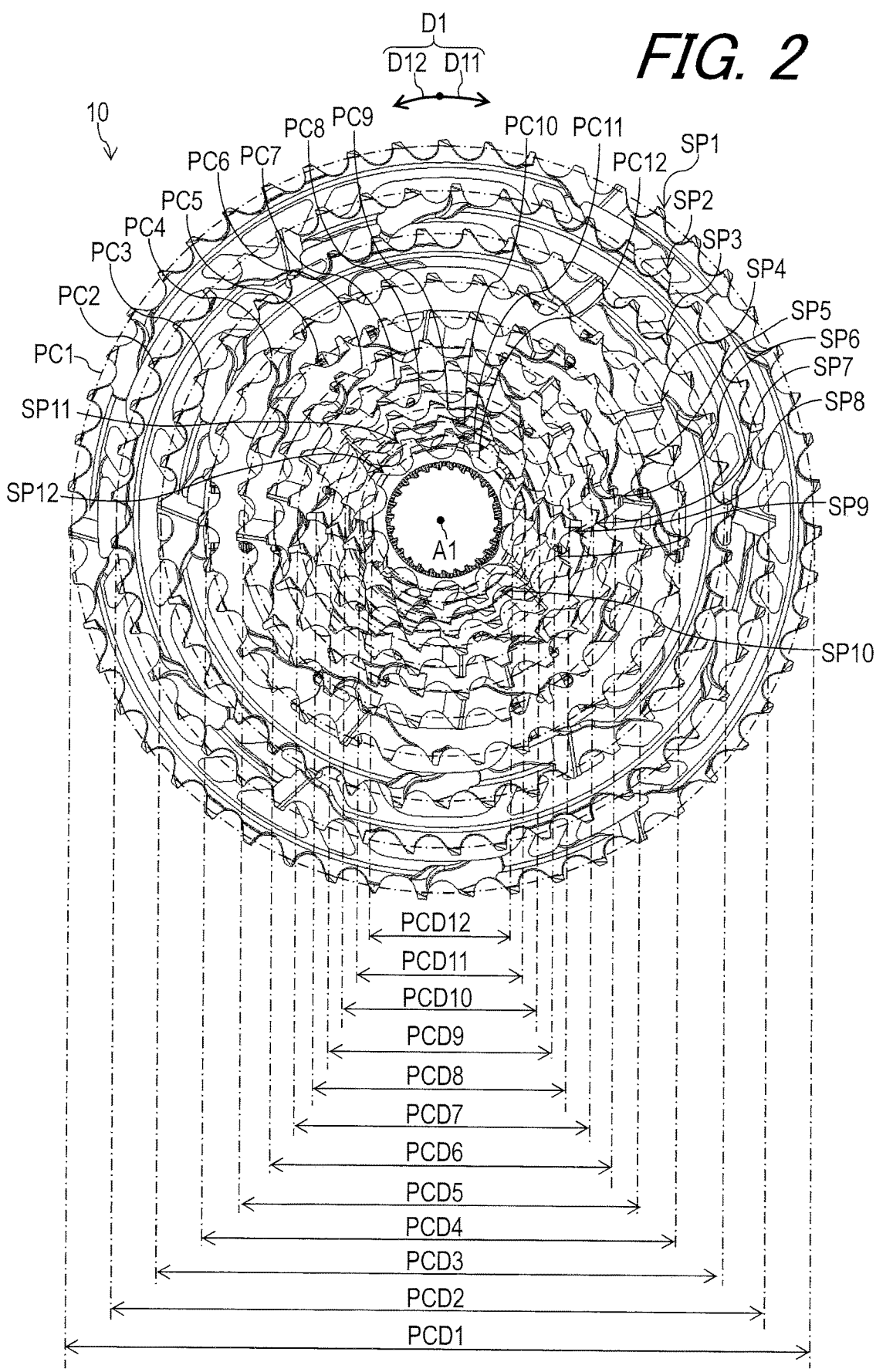
FIG. 2 is a side elevational view of the bicycle rear sprocket assembly illustrated in FIG. 1.

As seen in FIG. 2, the first sprocket SP1 has a first pitch-circle diameter PCD1. The second sprocket SP2 has a second pitch-circle diameter PCD2. The third sprocket SP3 has a third pitch-circle diameter PCD3. The fourth sprocket SP4 has a fourth pitch-circle diameter PCD4. The fifth sprocket SP5 has a fifth pitch-circle diameter PCD5. The sixth sprocket SP6 has a sixth pitch-circle diameter PCD6. The seventh sprocket SP7 has a seventh pitch-circle diameter PCD7. The eighth sprocket SP8 has an eighth pitch-circle diameter PCD8. The ninth sprocket SP9 has a ninth pitch-circle diameter PCD9. The tenth sprocket SP10 has a tenth pitch-circle diameter PCD10. The eleventh sprocket SP11 has an eleventh pitch-circle diameter PCD11. The twelfth sprocket SP12 has a twelfth pitch-circle diameter PCD12.

The first sprocket SP1 has a first pitch circle PC1 having the first pitch-circle diameter PCD1. The second sprocket SP2 has a second pitch circle PC2 having the second pitch-circle diameter PCD2. The third sprocket SP3 has a third pitch circle PC3 having the third pitch-circle diameter PCD3. The fourth sprocket SP4 has a fourth pitch circle PC4 having the fourth pitch-circle diameter PCD4. The fifth sprocket SP5 has a fifth pitch circle PC5 having the fifth pitch-circle diameter PCD5. The sixth sprocket SP6 has a sixth pitch circle PC6 having the sixth pitch-circle diameter PCD6. The seventh sprocket SP7 has a seventh pitch circle PC7 having the seventh pitch-circle diameter PCD7. The eighth sprocket SP8 has an eighth pitch circle PC8 having the eighth pitch-circle diameter PCD8. The ninth sprocket SP9 has a ninth pitch circle PC9 having the ninth pitch-circle diameter PCD9. The tenth sprocket SP10 has a tenth pitch circle PC10 having the tenth pitch-circle diameter PCD10. The eleventh sprocket SP11 has an eleventh pitch circle PC11 having the eleventh pitch-circle diameter PCD11. The twelfth sprocket SP12 has a twelfth pitch circle PC12 having the twelfth pitch-circle diameter PCD12.

The first pitch circle PC1 is defined by center axes of pins of the bicycle chain 8 (FIG. 1) engaging with the first sprocket SP1. The second to twelfth pitch circles PC2 to PC12 are defined as well as the first pitch circle PC1. Thus, they will not be descried in detail here for the sake of brevity.

In this embodiment, the first pitch-circle diameter PCD1 is larger than the second pitch-circle diameter PCD2. The second pitch-circle diameter PCD2 is larger than the third pitch-circle diameter PCD3. The third pitch-circle diameter PCD3 is larger than the fourth pitch-circle diameter PCD4. The first pitch-circle diameter PCD1 is the largest pitch-circle diameter in the bicycle rear sprocket assembly 10. The twelfth pitch-circle diameter PCD12 is the smallest pitch-circle diameter in the bicycle rear sprocket assembly 10. The first sprocket SP1 corresponds to low gear in the bicycle rear sprocket assembly 10. The twelfth sprocket SP12 corresponds to top gear in the bicycle rear sprocket assembly 10. However, the first sprocket SP1 can correspond to another gear in the bicycle rear sprocket assembly 10.

Figure 3:
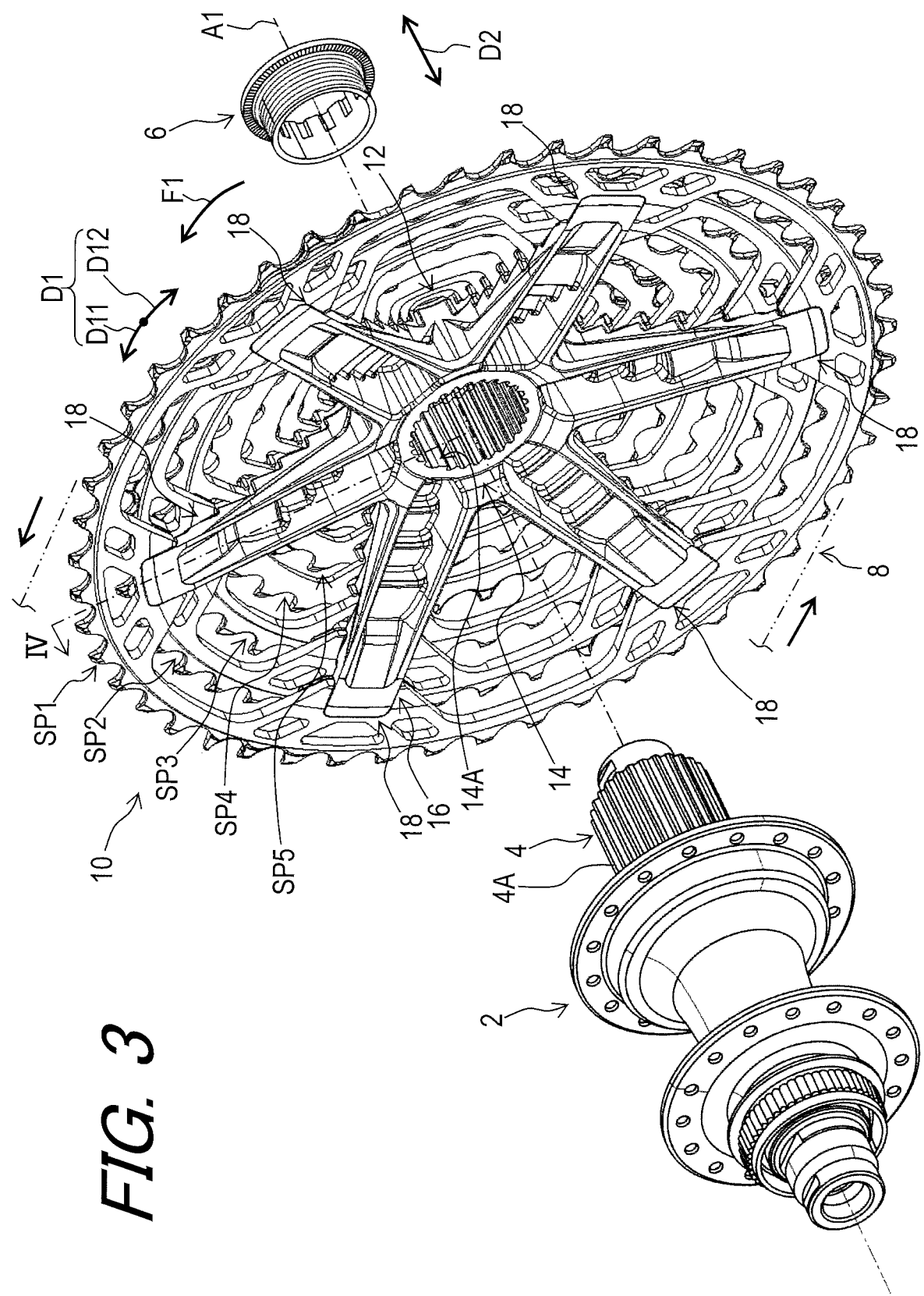
FIG. 3 is another perspective view of the bicycle rear sprocket assembly illustrated in FIG. 1, with the bicycle hub assembly and the lock ring.

As seen in FIG. 3, the bicycle rear sprocket assembly 10 comprises a sprocket support 12. The sprocket support 12 is configured to engage with the bicycle hub assembly 2. The sprocket support 12 includes a hub engagement part 14 configured to engage with the bicycle hub assembly 2. The hub engagement part 14 includes an internal spline 14A. The sprocket support body 4 of the bicycle hub assembly 2 includes an external spline 4A. The internal spline 14A of the hub engagement part 14 is engageable with the external spline 4A of the sprocket support body 4 to transmit the driving rotational force F1 between the bicycle rear sprocket assembly 10 and the bicycle hub assembly 2. The sprocket support 12 includes a sprocket attachment part 16. The sprocket attachment part 16 includes a plurality of support arms 18 extending radially outwardly from the hub engagement part 14. In this embodiment, the sprocket attachment part 16 includes six support arms 18. However, a total number of the support arms 18 is not limited to this embodiment.

Figure 4:
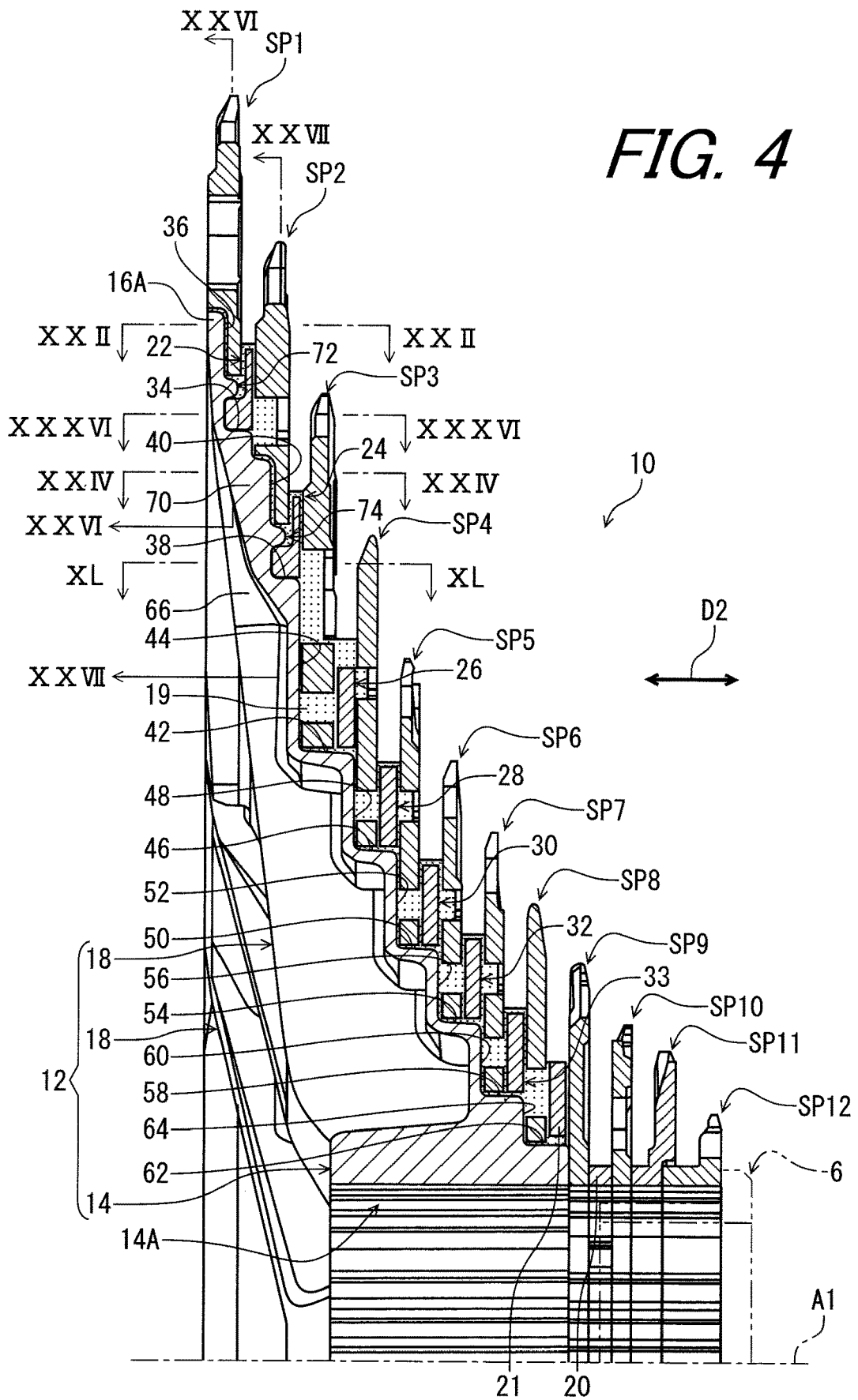
FIG. 4 is a cross-sectional view of the bicycle rear sprocket assembly taken along line IV-IV of FIG. 3.

As seen in FIG. 4, the first to twelfth sprockets SP1 to SP12 are arranged in this order in an axial direction D2 parallel to the rotational center axis A1. The first sprocket SP1 is adjacent to the second sprocket SP2 without another sprocket between the first sprocket SP1 and the second sprocket SP2 in the axial direction D2 with respect to the rotational center axis A1. The second sprocket SP2 is adjacent to the third sprocket SP3 without another sprocket between the second sprocket SP2 and the third sprocket SP3 in the axial direction D2 with respect to the rotational center axis A1. The third sprocket SP3 is adjacent to the fourth sprocket SP4 without another sprocket between the third sprocket SP3 and the fourth sprocket SP4 in the axial direction D2 with respect to the rotational center axis A1. The fifth to twelfth sprockets SP5 to SP12 are arranged in the axial direction D2 in this order.

The first sprocket SP1 and the second sprocket SP2 are attached to the sprocket attachment part 16. The third sprocket SP3 and the fourth sprocket SP4 are attached to the sprocket attachment part 16. The first sprocket SP1 and the second sprocket SP2 are attached to the plurality of support arms 18. At least one of the fifth to twelfth sprockets SP5 to SP12 are attached to at least one of the hub engagement part 14 and the sprocket attachment part 16. In this embodiment, the third to eighth sprockets SP3 to SP8 are attached to the plurality of support arms 18. The eighth and ninth sprockets SP8 and SP9 are attached to the hub engagement part 14.

Figure 5:
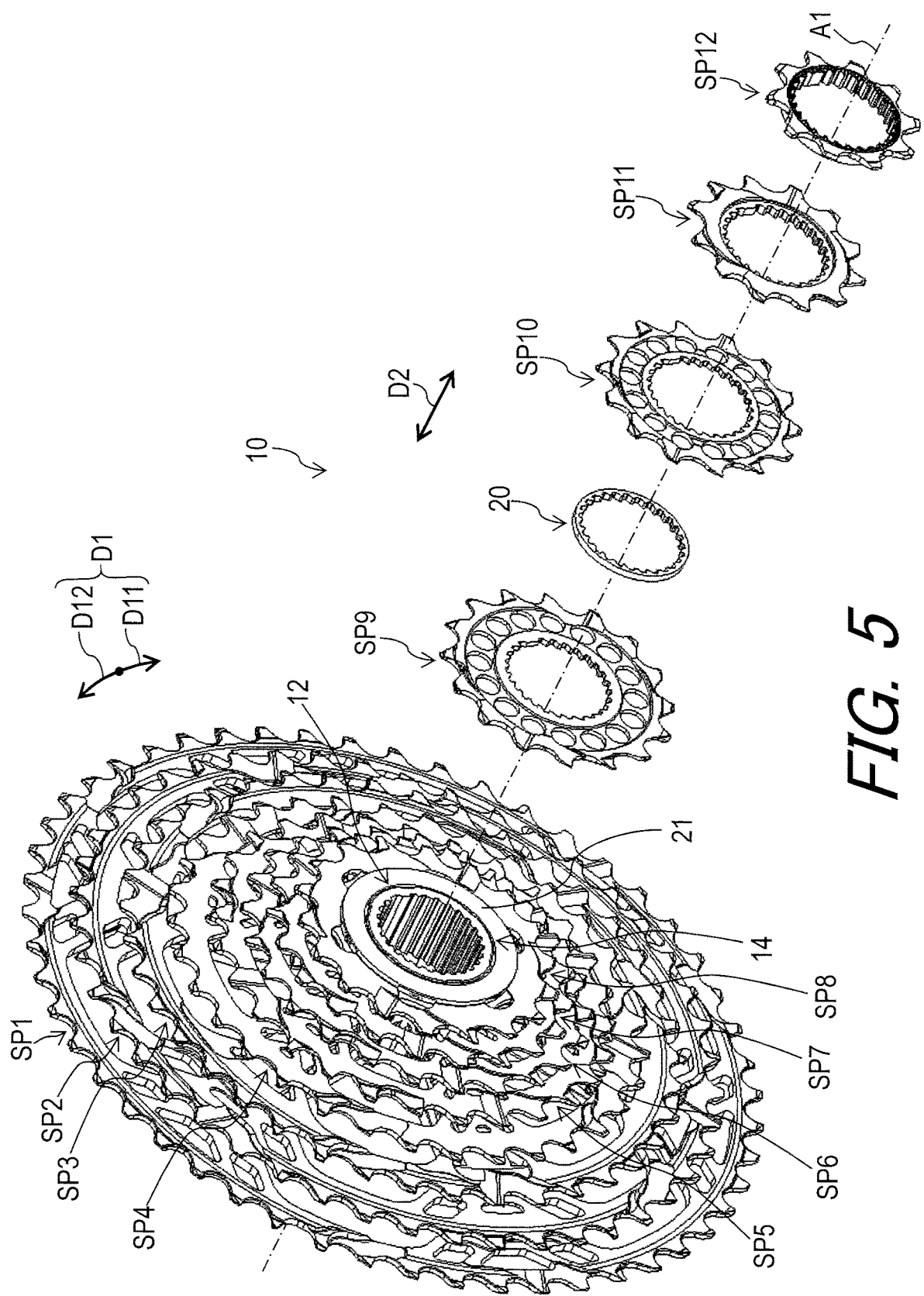
FIG. 5 is an exploded perspective view of the bicycle rear sprocket assembly illustrated in FIG. 1.

As seen in FIG. 5, the bicycle rear sprocket assembly 10 comprises an intermediate ring 20 and a ring cover 21. The intermediate ring 20 is provided between the ninth sprocket SP9 and the tenth sprocket SP10 in the axial direction D2. The ring cover 21 is provided between the eighth sprocket SP8 and the ninth sprocket SP9 in the axial direction D2. The first to eighth sprockets SP1 to SP8 and the ring cover 21 are mounted on the sprocket support 12. The ninth to twelfth sprockets SP9 to SP12 and the intermediate ring 20 are not mounted on the sprocket support 12.

As seen in FIG. 4, the ninth to twelfth sprockets SP9 to SP12 and the intermediate ring 20 are held between the sprocket support 12 and the lock ring 6 in a state where the bicycle rear sprocket assembly 10 is mounted on the bicycle hub assembly 2 (FIG. 1). The ninth to twelfth sprockets SP9 to SP12 and the intermediate ring 20 are not attached to each other. However, at least one of the ninth to twelfth sprockets SP9 to SP12 and the intermediate ring 20 can be attached to an adjacent member.

The first to eighth sprockets SP1 to SP8 are attached to the sprocket support 12 in this embodiment. The ring cover 21 is attached to at least one of the sprocket support 12 and the eighth sprocket SP8. For example, the first to eighth sprockets SP1 to SP8 are attached to the sprocket support 12 with a bonding structure such as adhesive without a metallic fastener. For example, the bicycle rear sprocket assembly 10 comprises an adhesive 19. This structure saves weight of the bicycle rear sprocket assembly 10. However, at least one of the first to twelfth sprockets SP1 to SP12 can be attached to the sprocket support 12 with a metallic fastener.

In this embodiment, the first to twelfth sprockets SP1 to SP12, the intermediate ring 20, and the ring cover 21 are separate members from each other. However, at least one of the first to twelfth sprockets SP1 to SP12, the intermediate ring 20, and the ring cover 21 can be integrally provided with another of the first to twelfth sprockets SP1 to SP12, the intermediate ring 20, and the ring cover 21 as a one-piece unitary member.

The first sprocket SP1 is made of a first metallic material. The second to twelfth sprockets SP2 to SP12 are made of second to twelfth metallic materials. Preferably, the first metallic material includes aluminum. Each of the second to twelfth metallic materials includes aluminum. However, materials of the first to twelfth sprockets SP1 to SP12 are not limited to this embodiment. Each of the first to twelfth metallic materials can include iron, titanium, and stainless steel. Each of the first to twelfth sprockets SP1 to SP12 can include a non-metallic material. The sprocket support 12 is made of a second material. The second material includes a non-metallic material such as a resin material, fiber-reinforced-plastic and carbon-fiber-reinforced-plastic. However, the second material can include a metallic material such as iron, aluminum, titanium, and stainless steel.

Figure 6:
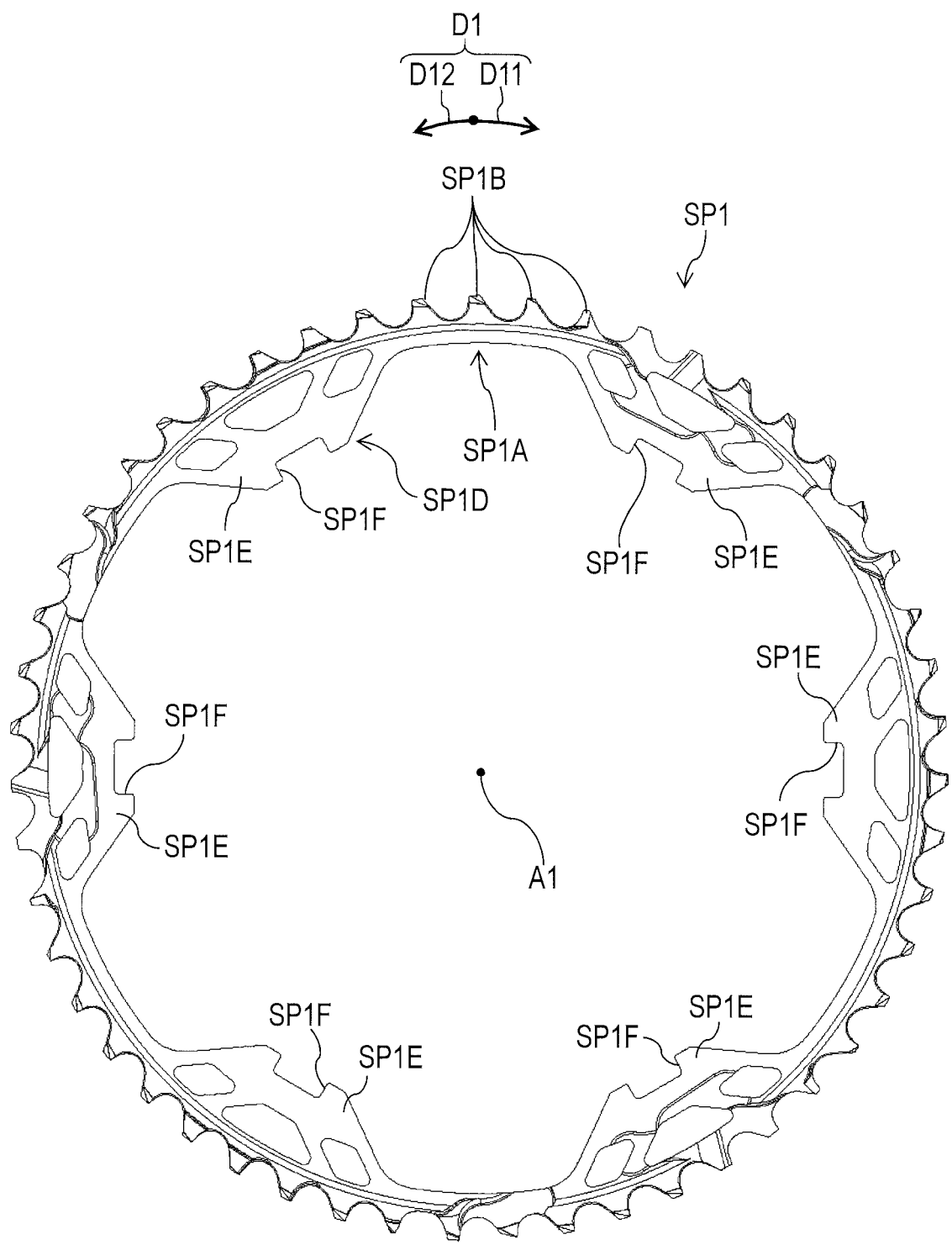
FIG. 6 is a side elevational view of a first sprocket of the bicycle rear sprocket assembly illustrated in FIG. 1.

As seen in FIG. 6, the first sprocket SP1 includes a first sprocket body SP1A and a plurality of first sprocket teeth SP1B. The plurality of first sprocket teeth SP1B extends radially outwardly from the first sprocket body SP1A with respect to the rotational center axis A1 of the bicycle rear sprocket assembly 10.

Figure 7:
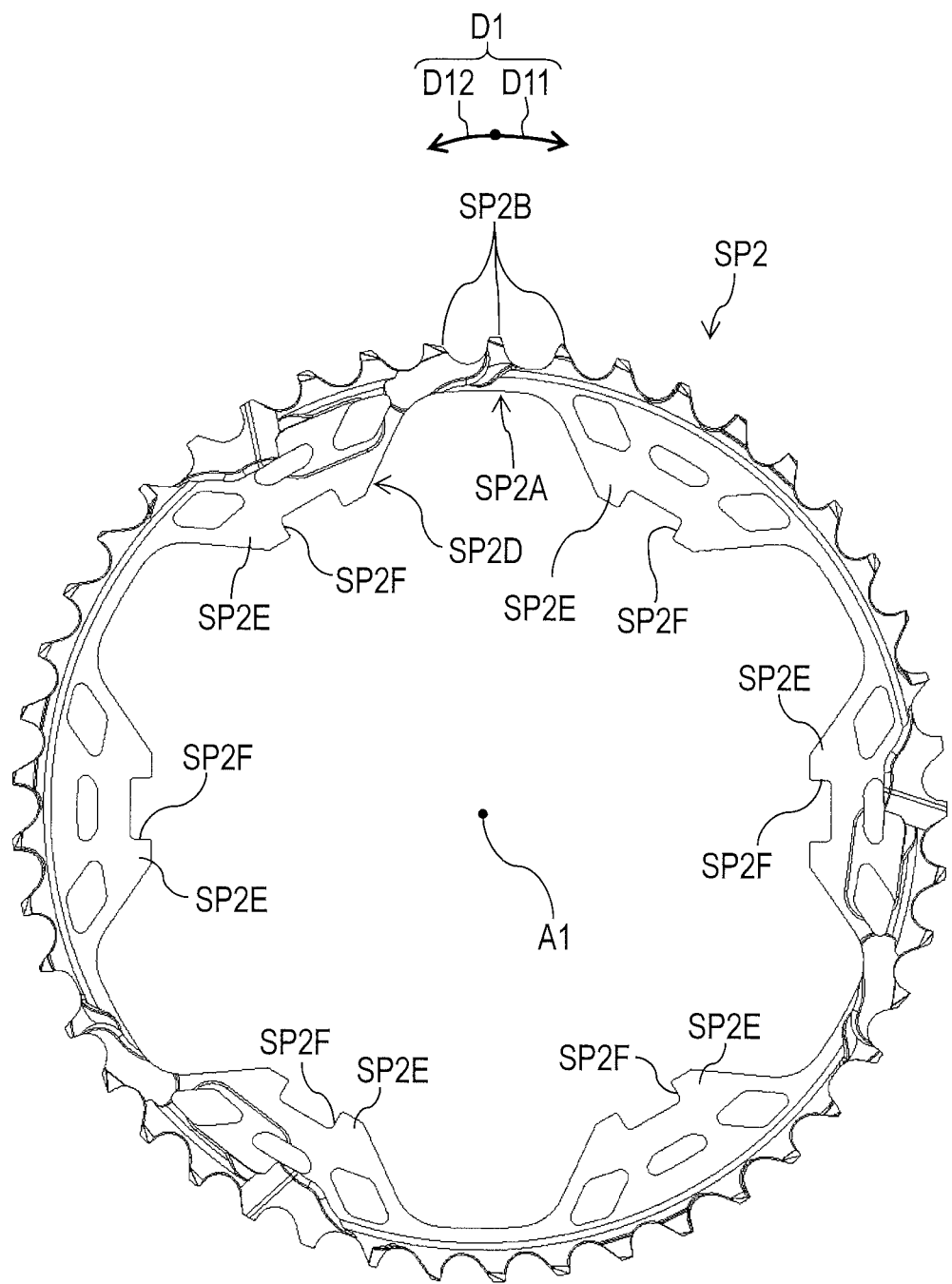
FIG. 7 is a side elevational view of a second sprocket of the bicycle rear sprocket assembly illustrated in FIG. 1.

As seen in FIG. 7, the second sprocket SP2 includes a second sprocket body SP2A and a plurality of second sprocket teeth SP2B. The plurality of second sprocket teeth SP2B extends radially outwardly from the second sprocket body SP2A with respect to the rotational center axis A1.

Figure 8:
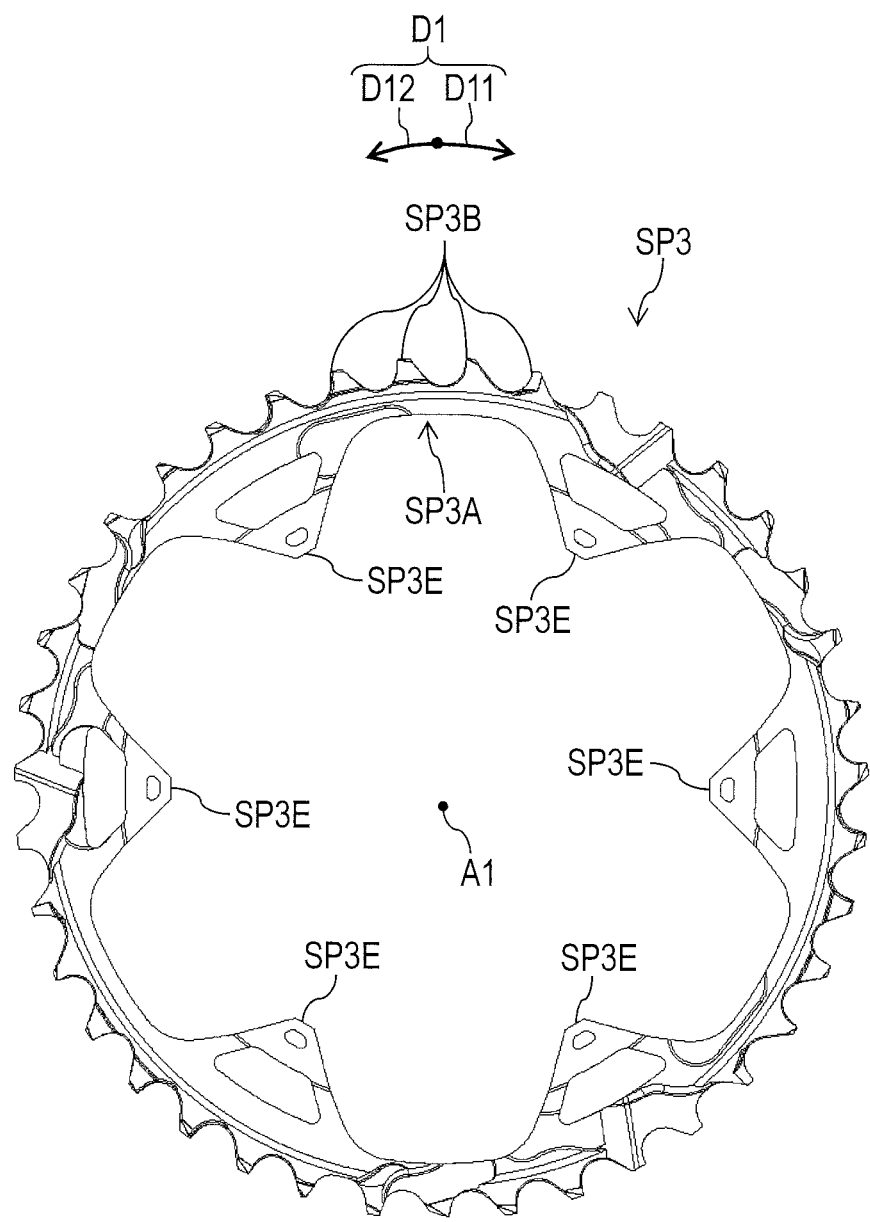
FIG. 8 is a side elevational view of a third sprocket of the bicycle rear sprocket assembly illustrated in FIG. 1.

As seen in FIG. 8, the third sprocket SP3 includes a third sprocket body SP3A and a plurality of third sprocket teeth SP3B. The plurality of third sprocket teeth SP3B extends radially outwardly from the third sprocket body SP3A with respect to the rotational center axis A1.

Figure 9:
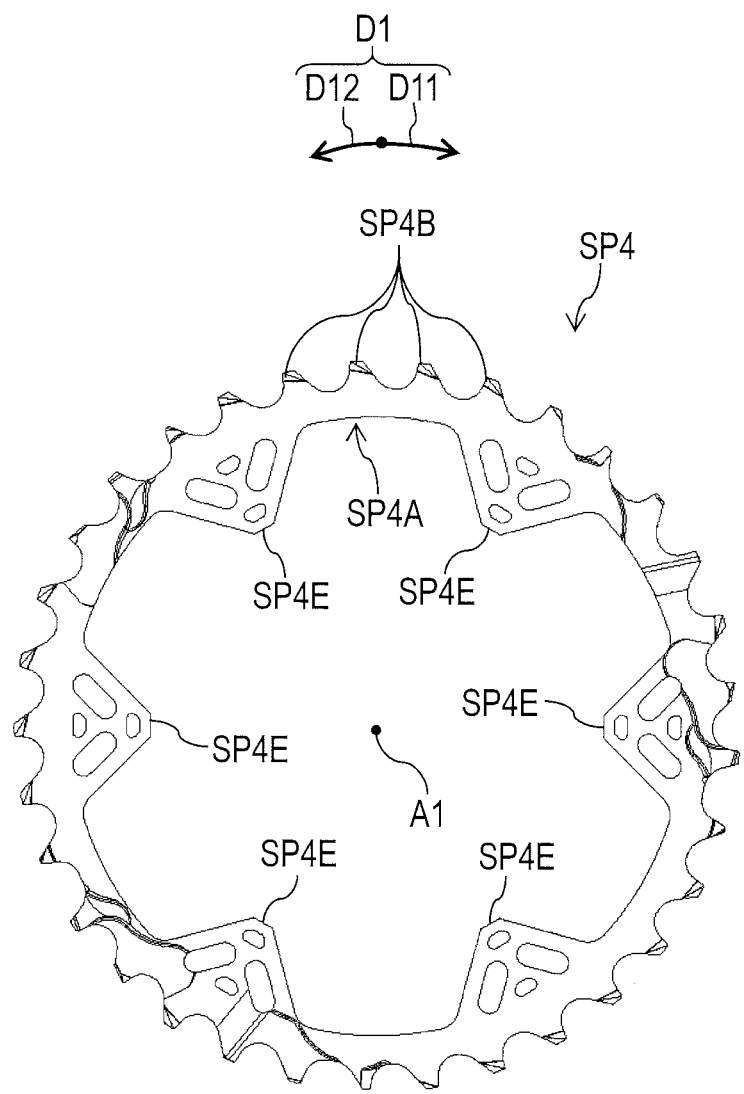
FIG. 9 is a side elevational view of a fourth sprocket of the bicycle rear sprocket assembly illustrated in FIG. 1.

As seen in FIG. 9, the fourth sprocket SP4 includes a fourth sprocket body SP4A and a plurality of fourth sprocket teeth SP4B. The plurality of fourth sprocket teeth SP4B extends radially outwardly from the fourth sprocket body SP4A with respect to the rotational center axis A1.

Figure 10:
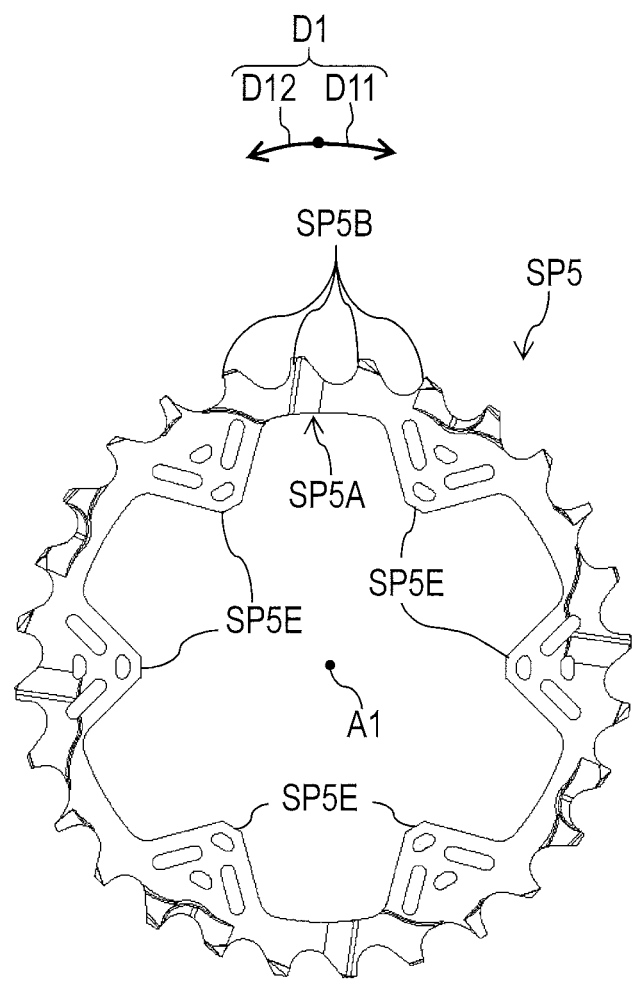
FIG. 10 is a side elevational view of a fifth sprocket of the bicycle rear sprocket assembly illustrated in FIG. 1.

As seen in FIG. 10, the fifth sprocket SP5 includes a fifth sprocket body SP5A and a plurality of fifth sprocket teeth SP5B. The plurality of fifth sprocket teeth SP5B extends radially outwardly from the fifth sprocket body SP5A with respect to the rotational center axis A1.

Figure 11:
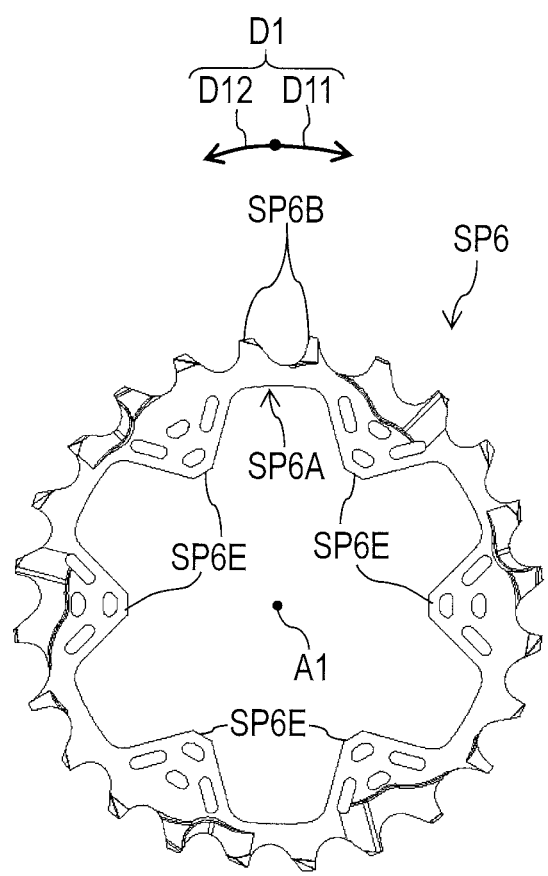
FIG. 11 is a side elevational view of a sixth sprocket of the bicycle rear sprocket assembly illustrated in FIG. 1.

As seen in FIG. 11, the sixth sprocket SP6 includes a sixth sprocket body SP6A and a plurality of sixth sprocket teeth SP6B. The plurality of sixth sprocket teeth SP6B extends radially outwardly from the sixth sprocket body SP6A with respect to the rotational center axis A1.

Figure 12:
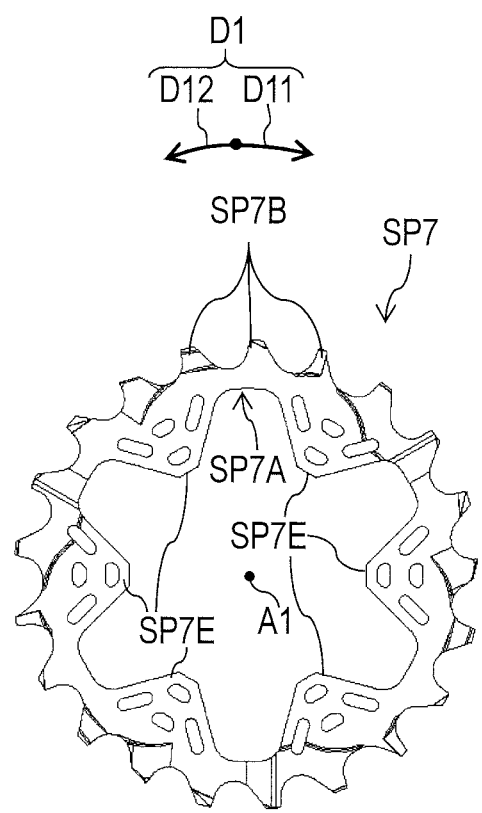
FIG. 12 is a side elevational view of a seventh sprocket of the bicycle rear sprocket assembly illustrated in FIG. 1.

As seen in FIG. 12, the seventh sprocket SP7 includes a seventh sprocket body SP7A and a plurality of seventh sprocket teeth SP7B. The plurality of seventh sprocket teeth SP7B extends radially outwardly from the seventh sprocket body SP7A with respect to the rotational center axis A1.

Figure 13:
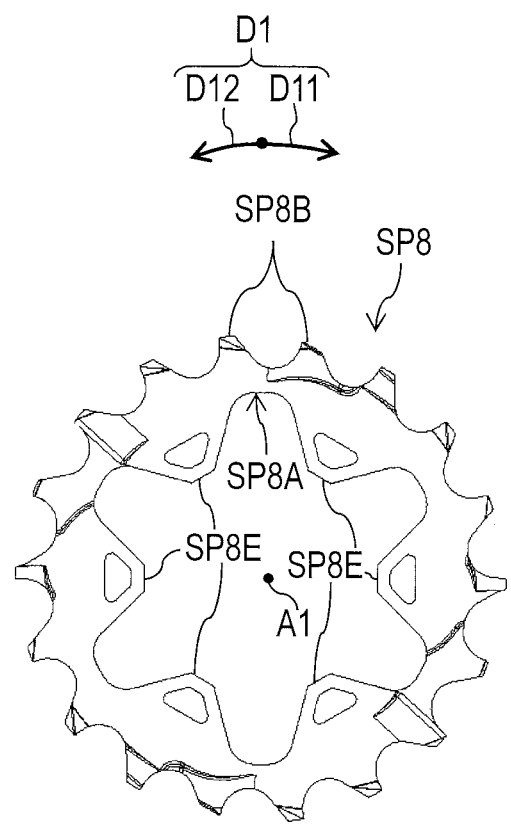
FIG. 13 is a side elevational view of an eighth sprocket of the bicycle rear sprocket assembly illustrated in FIG. 1.

As seen in FIG. 13, the eighth sprocket SP8 includes an eighth sprocket body SP8A and a plurality of eighth sprocket teeth SP8B. The plurality of eighth sprocket teeth SP8B extends radially outwardly from the eighth sprocket body SP8A with respect to the rotational center axis A1.

Figure 14:
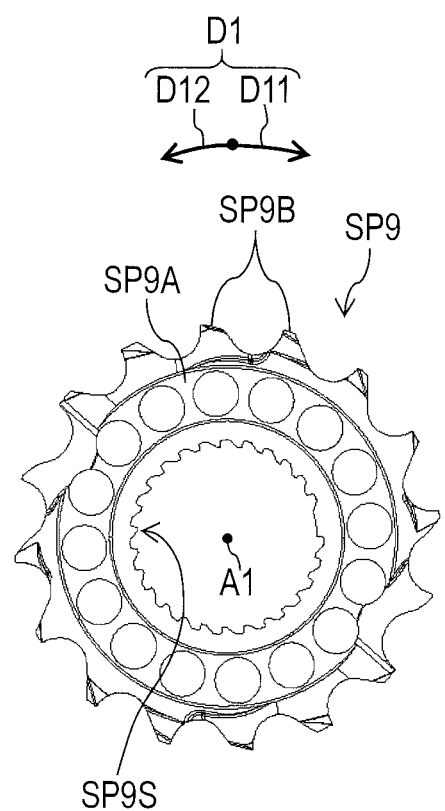
FIG. 14 is a side elevational view of a ninth sprocket of the bicycle rear sprocket assembly illustrated in FIG. 1.

As seen in FIG. 14, the ninth sprocket SP9 includes a ninth sprocket body SP9A and a plurality of ninth sprocket teeth SP9B. The plurality of ninth sprocket teeth SP9B extends radially outwardly from the ninth sprocket body SP9A with respect to the rotational center axis A1. The ninth sprocket SP9 includes an internal spline SP9S engageable with the external spline 4A of the bicycle hub assembly 2 (FIG. 1).

Figure 15:
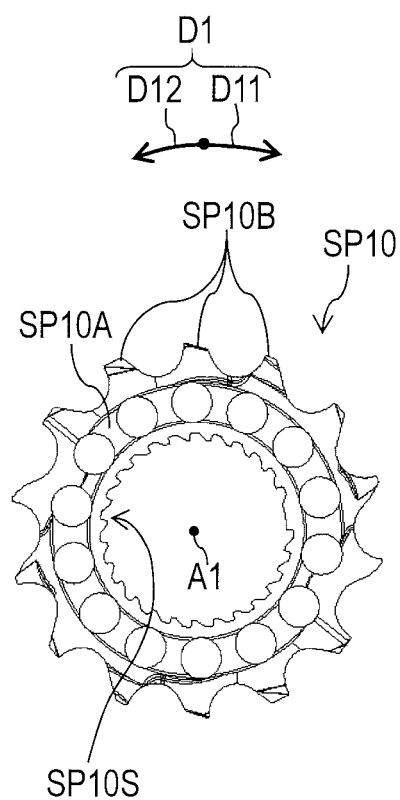
FIG. 15 is a side elevational view of a tenth sprocket of the bicycle rear sprocket assembly illustrated in FIG. 1.

As seen in FIG. 15, the tenth sprocket SP10 includes a tenth sprocket body SP10A and a plurality of tenth sprocket teeth SP10B. The plurality of tenth sprocket teeth SP10B extends radially outwardly from the tenth sprocket body SP10A with respect to the rotational center axis A1. The tenth sprocket SP10 includes an internal spline SP10S engageable with the external spline 4A of the bicycle hub assembly 2 (FIG. 1).

Figure 16:
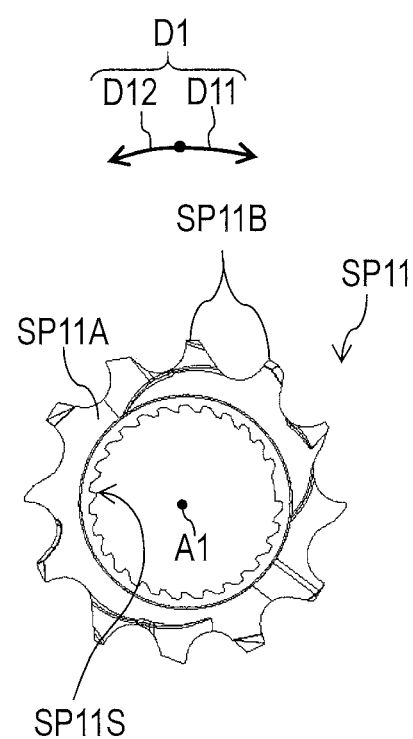
FIG. 16 is a side elevational view of an eleventh sprocket of the bicycle rear sprocket assembly illustrated in FIG. 1.

As seen in FIG. 16, the eleventh sprocket SP11 includes an eleventh sprocket body SP11A and a plurality of eleventh sprocket teeth SP11B. The plurality of eleventh sprocket teeth SP11B extends radially outwardly from the eleventh sprocket body SP11A with respect to the rotational center axis A1. The eleventh sprocket SP11 includes an internal spline SP11S engageable with the external spline 4A of the bicycle hub assembly 2 (FIG. 1).

Figure 17:
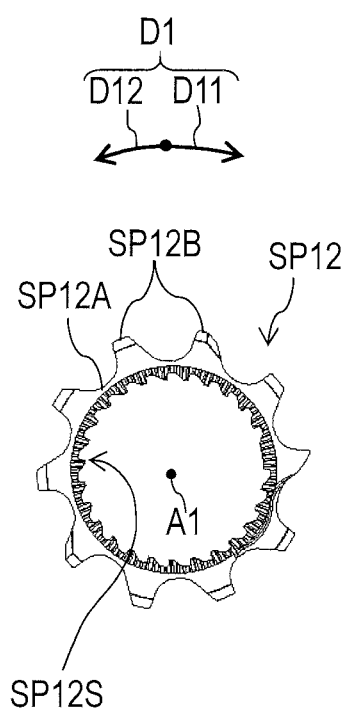
FIG. 17 is a side elevational view of a twelfth sprocket of the bicycle rear sprocket assembly illustrated in FIG. 1.

As seen in FIG. 17, the twelfth sprocket SP12 includes a twelfth sprocket body SP12A and a plurality of twelfth sprocket teeth SP12B. The plurality of twelfth sprocket teeth SP12B extends radially outwardly from the twelfth sprocket body SP12A with respect to the rotational center axis A1. The twelfth sprocket SP12 includes an internal spline SP12S engageable with the external spline 4A of the bicycle hub assembly 2 (FIG. 1).

As seen in FIGS. 6 to 17, each of the first to twelfth sprocket bodies SP 1A to SP12A has an annular shape. However, the shape of each of the first to twelfth sprockets SP1 to SP12 is not limited to this embodiment.

Figure 18:
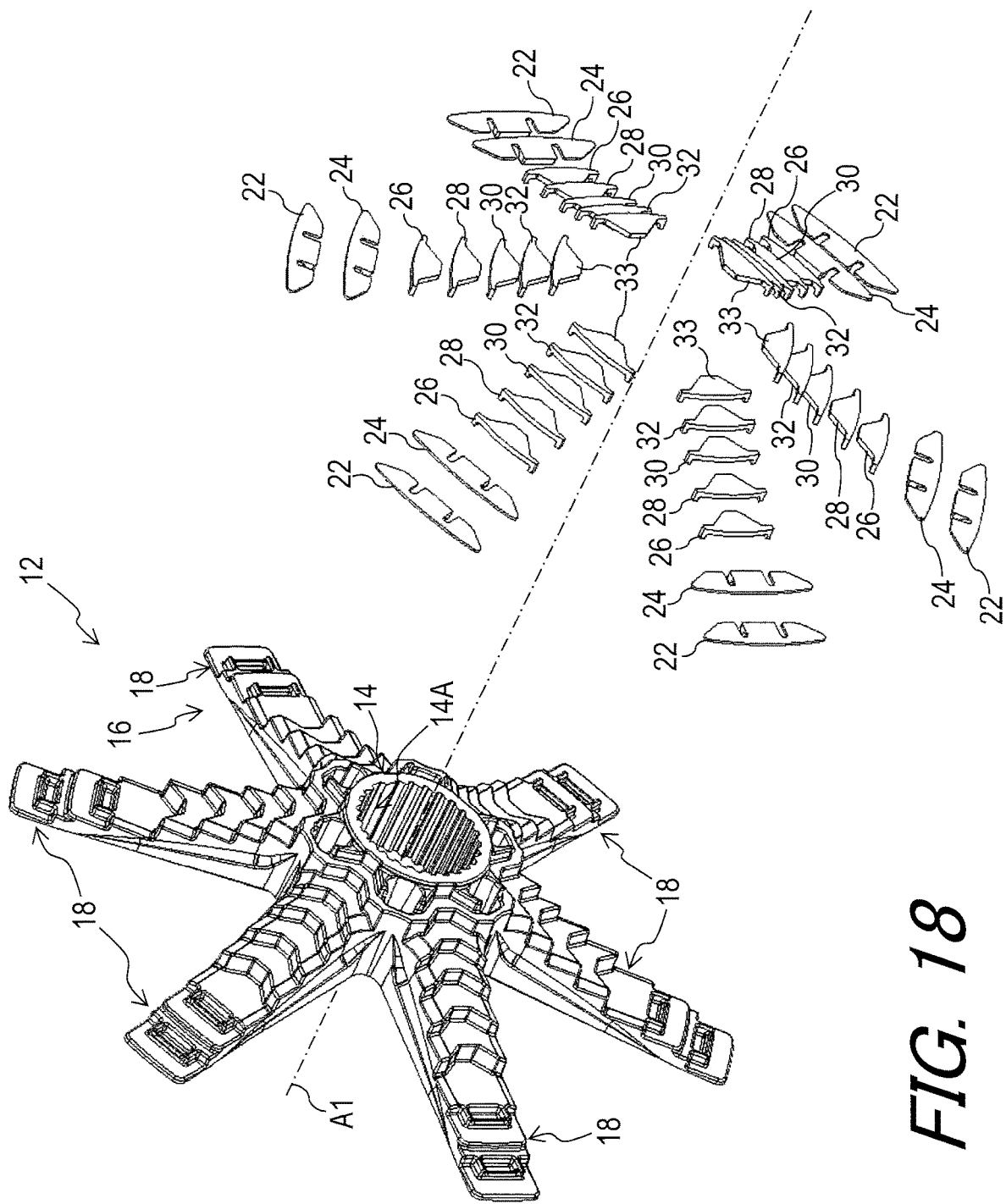
FIG. 18 is a perspective view of a sprocket support and a plurality of spacers of the bicycle rear sprocket assembly illustrated in FIG. 1.
Figure 19:
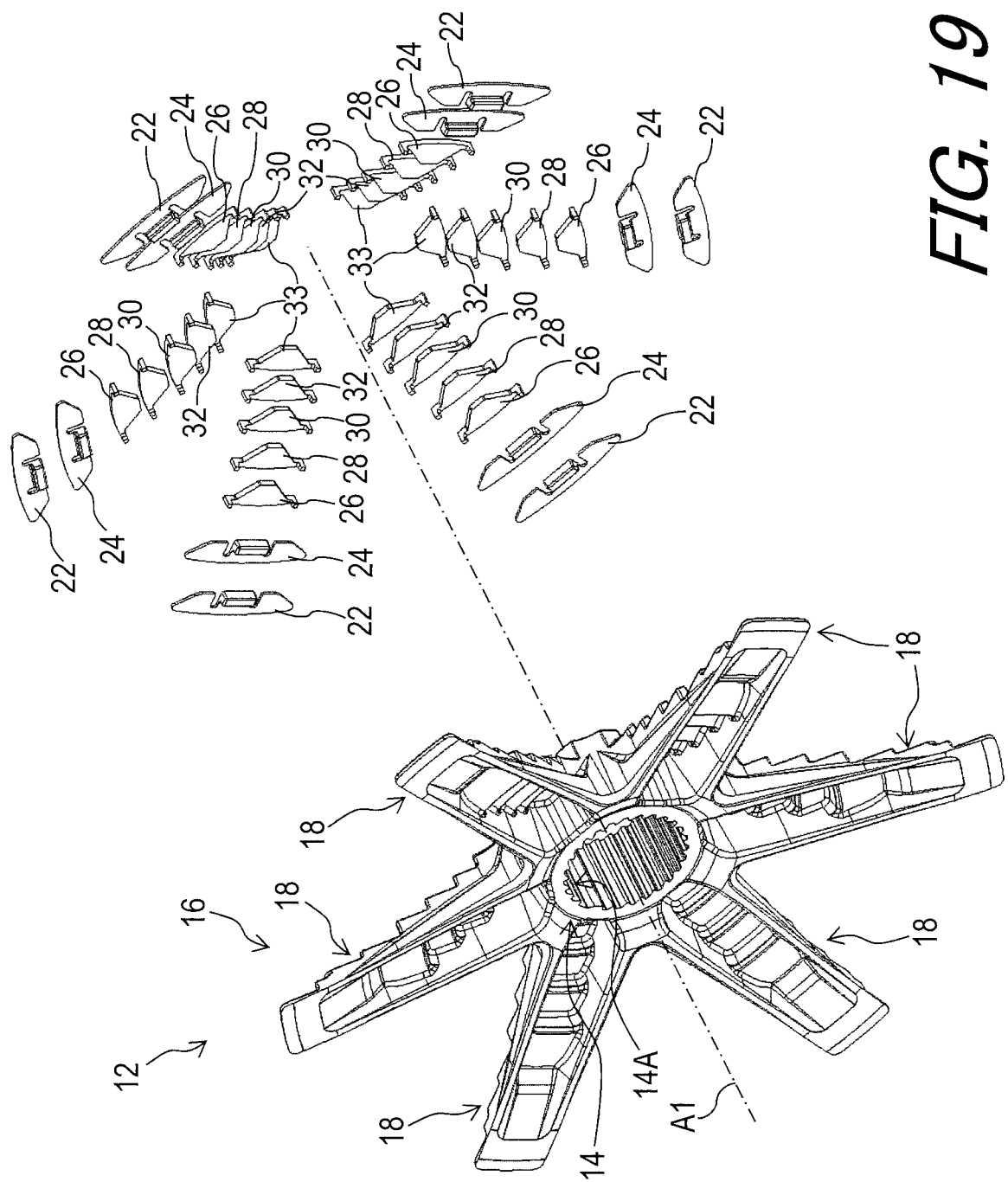
FIG. 19 is another perspective view of the sprocket support and the plurality of spacers of the bicycle rear sprocket assembly illustrated in FIG. 1.

As seen in FIGS. 18 and 19, the bicycle rear sprocket assembly 10 comprises a plurality of first spacers 22, a plurality of second spacers 24, a plurality of third spacers 26, a plurality of fourth spacers 28, a plurality of fifth spacers 30, a plurality of sixth spacers 32, and a plurality of seventh spacers 33. Each of the first to seventh spacers 22 to 33 is made of a non-metallic material such as a resin material. However, the first to seventh spacers 22 to 33 can be made of a metallic material.

A total number of the first spacers 22 is equal to the total number of the support arms 18. A total number of the second spacers 24 is equal to the total number of the support arms 18. A total number of the third spacers 26 is equal to the total number of the support arms 18. A total number of the fourth spacers 28 is equal to the total number of the support arms 18. A total number of the fifth spacers 30 is equal to the total number of the support arms 18. A total number of the sixth spacers 32 is equal to the total number of the support arms 18. A total number of the seventh spacers 33 is equal to the total number of the support arms 18. However, the total number of the first spacers 22 is not limited to this embodiment. The total number of the second spacers 24 is not limited to this embodiment. The total number of the third spacers 26 is not limited to this embodiment. The total number of the fourth spacers 28 is not limited to this embodiment. The total number of the fifth spacers 30 is not limited to this embodiment. The total number of the sixth spacers 32 is not limited to this embodiment. The total number of the seventh spacers 33 is not limited to this embodiment.

Figure 20:
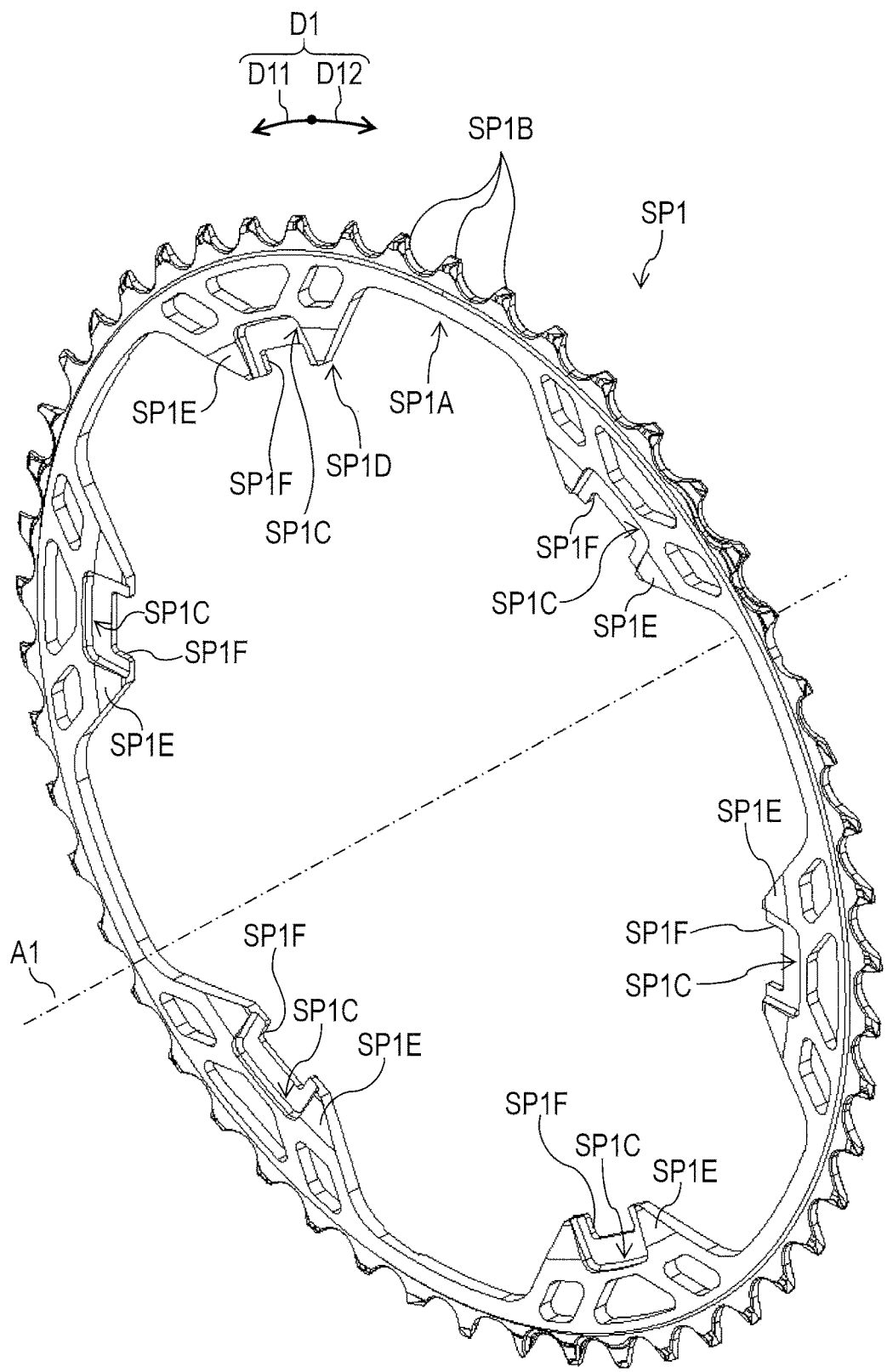
FIG. 20 is a perspective view of the first sprocket of the bicycle rear sprocket assembly illustrated in FIG. 1.

As seen in FIG. 20, the first sprocket body SP1A has at least one first recess SP1C. In this embodiment, the first sprocket body SP1A has a plurality of first recesses SP1C. A total number of the first recesses SP1C is equal to the total number of the support arms 18. However, the total number of the first recesses SP1C is not limited to this embodiment. At least one of the first recesses SP1C can be omitted from the first sprocket SP1.

The first sprocket body SP1A includes a first support attachment part SP1D having the at least one first recess SP1C. The first support attachment part SP1D includes a plurality of first attachment portions SP1E. The first attachment portion SP1E includes the first recess SP1C. A total number of the first attachment portions SP1E is equal to the total number of the support arms 18. However, the total number of the first attachment portions SP1E is not limited to this embodiment. At least one of the first attachment portions SP1E can be omitted from the first sprocket SP1.

Figure 21:
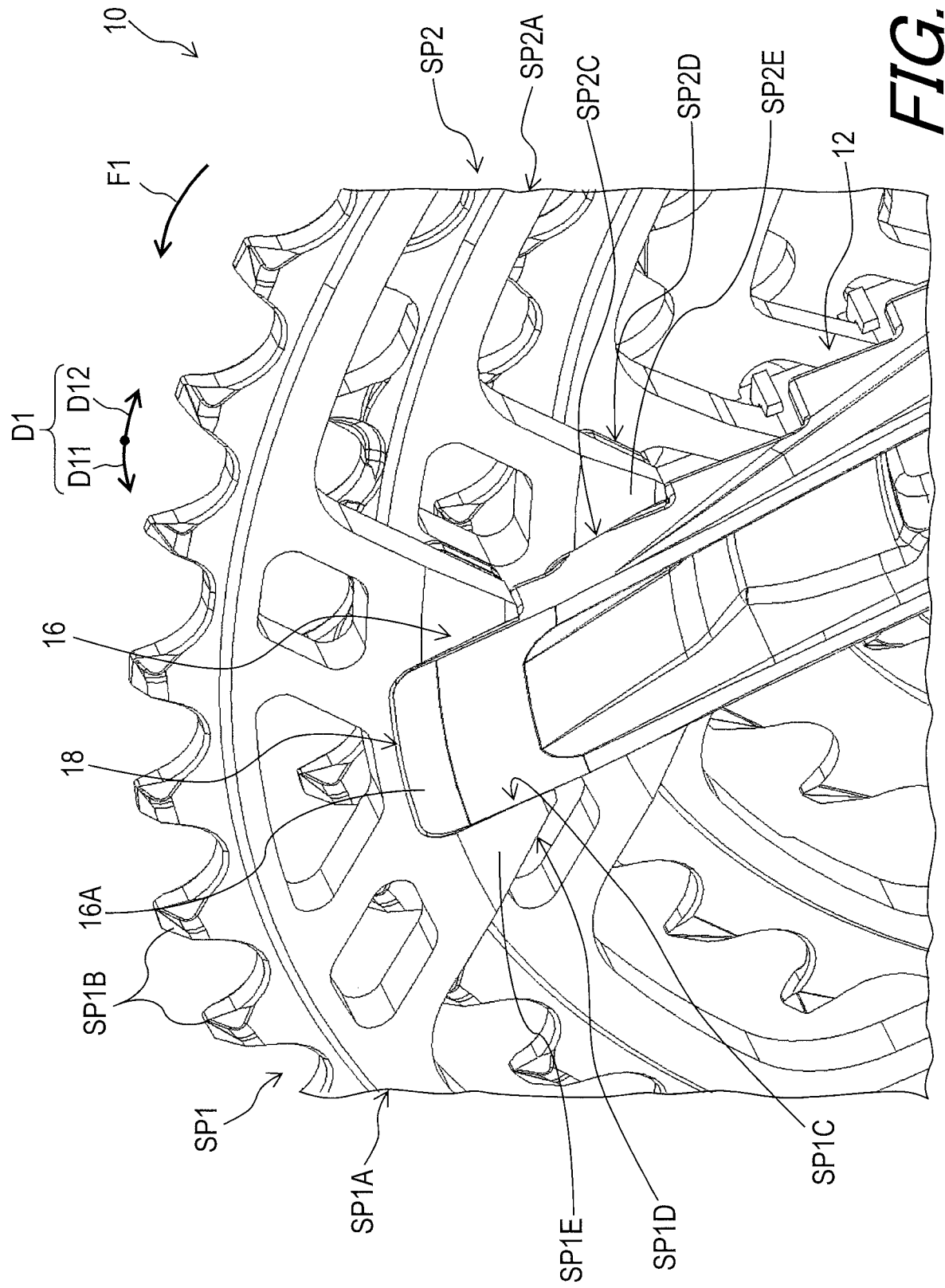
FIG. 21 is a partial perspective view of the bicycle rear sprocket assembly illustrated in FIG. 1.

As seen in FIG. 21, the sprocket attachment part 16 is at least partly provided in the at least one first recess SP to transmit the rotational force F1 between the first sprocket SP1 and the sprocket support 12. The sprocket attachment part 16 includes a radially outer end 16A. At least one arm of the plurality of support arms 18 includes the radially outer end 16A provided in the at least one first recess SP1C. In this embodiment, each of the support arms 18 includes the radially outer end 16A provided in the first recess SP1C. The radially outer end 16A is attached to the first support attachment part SP1D.

Figure 22:
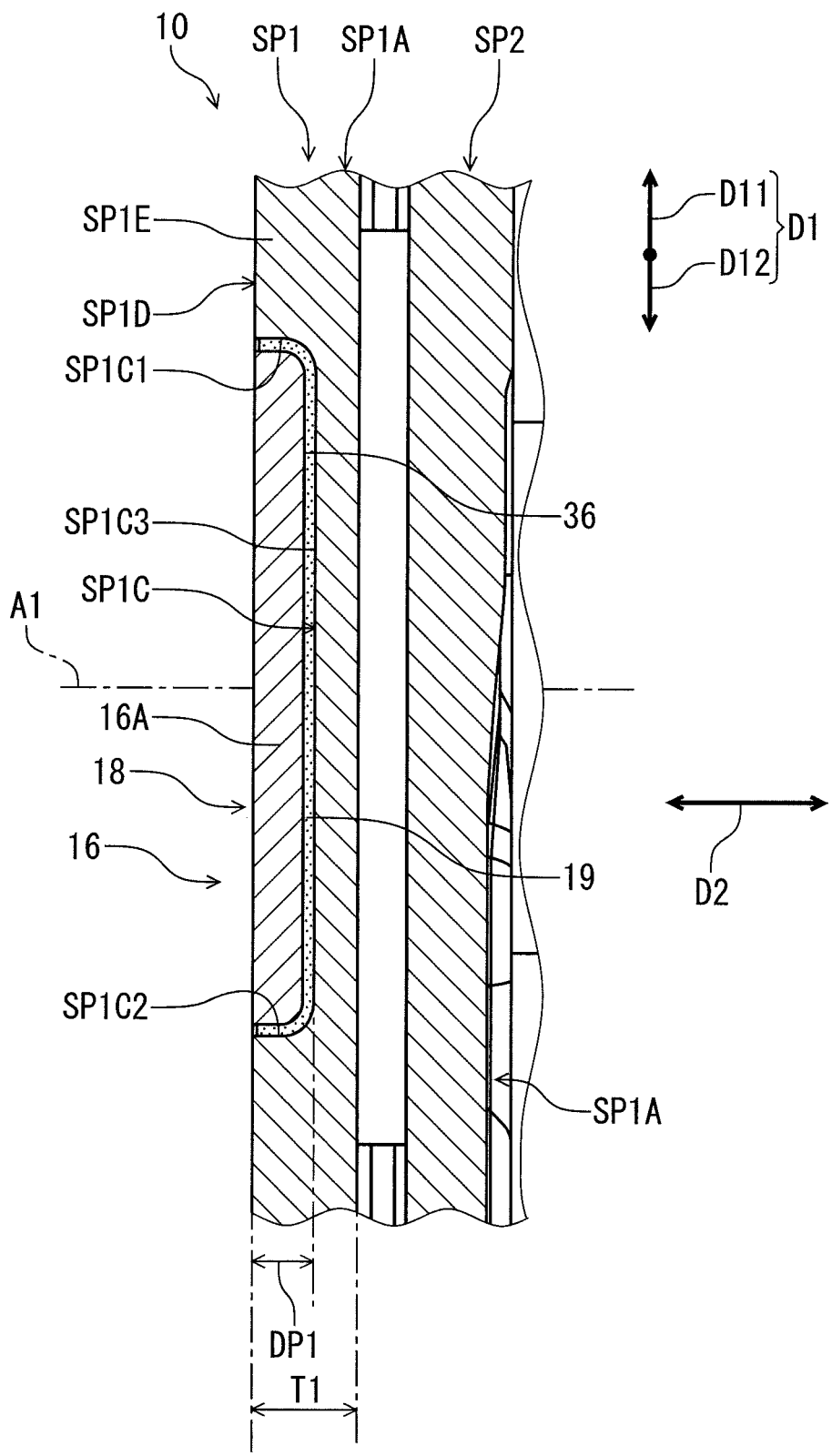
FIG. 22 is a cross-sectional view of the bicycle rear sprocket assembly taken along line XXII-XXII of FIG. 4.

As seen in FIG. 22, the at least one first recess SP1C includes a first circumferential surface SP and a first additional circumferential surface SP1C2. The first additional circumferential surface SP1C2 is spaced apart from the first circumferential surface SP1C1 in the circumferential direction D1 with respect to the rotational center axis A1. The first circumferential surface SP1C1 and the first additional circumferential surface SP face toward each other in the circumferential direction D1. The sprocket attachment part 16 is provided between the first circumferential surface SP1C1 and the first additional circumferential surface SP in the circumferential direction D1. The radially outer end 16A is provided between the first circumferential surface SP1C1 and the first additional circumferential surface SP in the circumferential direction D1.

The at least one first recess SP1C includes a first axial surface SP1C3 facing in the axial direction D2 with respect to the rotational center axis A1. The first axial surface SP1C3 is provided between the first circumferential surface SP1C1 and the first additional circumferential surface SP in the circumferential direction D1. The radially outer end 16A is attached to the first axial surface SP1C3 with the adhesive 19.

The first support attachment part SP1D has a first axial thickness T1 defined in the axial direction D2 with respect to the rotational center axis A1. The at least one first recess SP1C has a first axial depth DP1 defined in the axial direction D2. The first axial thickness T1 is larger than the first axial depth DP1.

The sprocket attachment part 16 at least partly faces the first axial surface SP1C3 in the axial direction D2. At least one of the first sprocket SP1 and the second sprocket SP2 is attached to the sprocket attachment part 16 by the adhesive 19. In this embodiment, the first sprocket SP1 and the second sprocket SP2 are attached to the sprocket attachment part 16 by the adhesive 19. The third to eighth sprockets SP3 to SP8 are attached to the sprocket attachment part 16 by the adhesive 19. However, one of the first sprocket SP1 and the second sprocket SP2 can be attached to the sprocket attachment part 16 by the adhesive 19.

Figure 23:
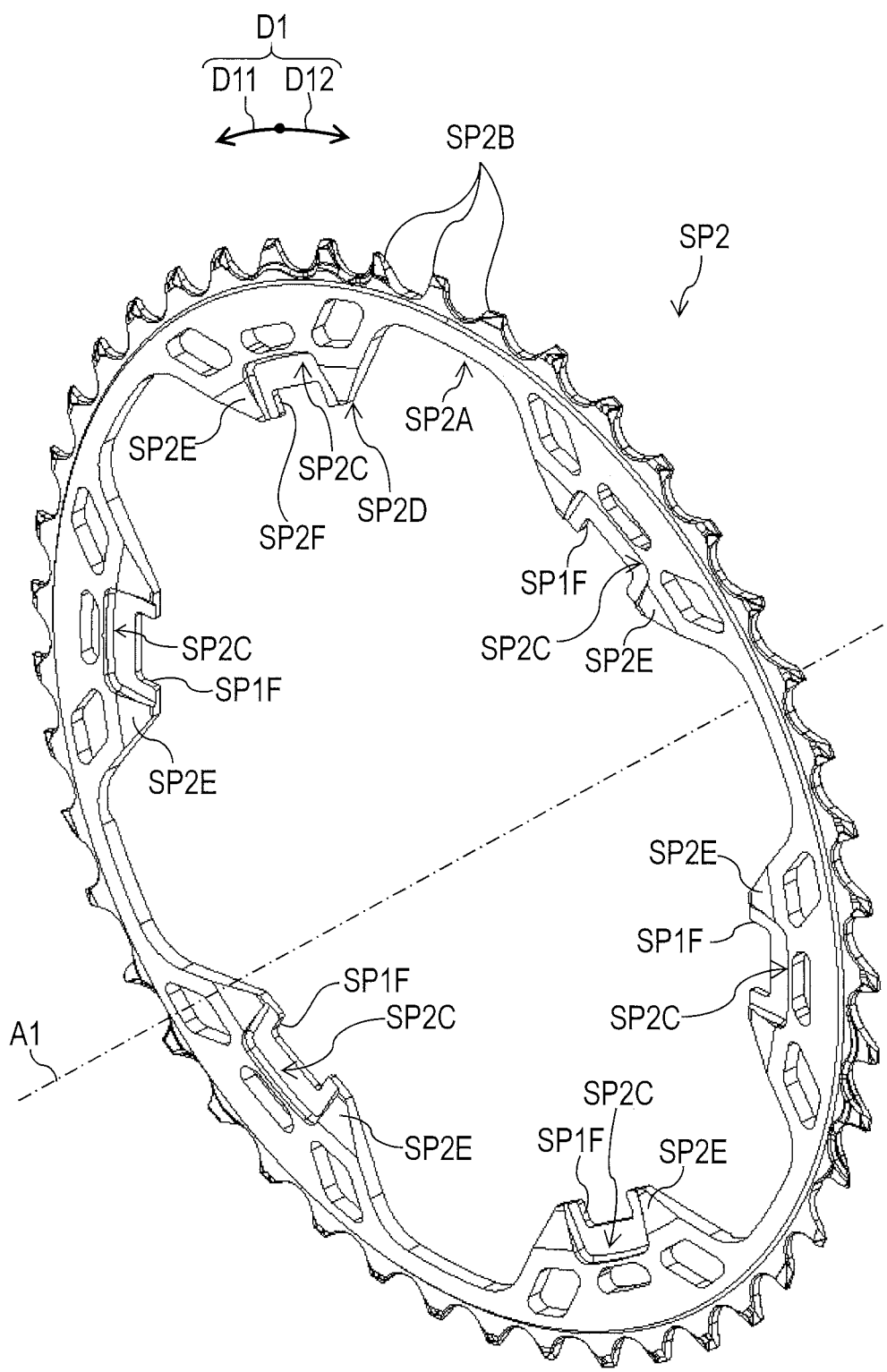
FIG. 23 is a perspective view of the second sprocket of the bicycle rear sprocket assembly illustrated in FIG. 1.

As seen in FIG. 23, the second sprocket body SP2A has at least one second recess SP2C. The sprocket attachment part 16 is at least partly provided in the at least one second recess SP2C. In this embodiment, the second sprocket body SP2A has a plurality of second recesses SP2C. A total number of the second recesses SP2C is equal to the total number of the support arms 18. However, a total number of the second recesses SP2C is not limited to this embodiment. At least one of the second recesses SP2C can be omitted from the second sprocket SP2.

The second sprocket body SP2A includes a second support attachment part SP2D having the at least one second recess SP2C. The second support attachment part SP2D includes a plurality of second attachment portions SP2E. The second attachment portion SP2E includes the second recess SP2C. A total number of the second attachment portions SP2E is equal to the total number of the support arms 18. However, the total number of the second attachment portions SP2E is not limited to this embodiment. At least one of the second attachment portions SP2E can be omitted from the second sprocket SP2.

As seen in FIG. 21, the sprocket attachment part 16 is at least partly provided in the at least one second recess SP2C to transmit the rotational force F1 between the second sprocket SP2 and the sprocket support 12. In this embodiment, the support arm 18 is partly provided in the second recess SP2C. The support arm 18 is attached to the second support attachment part SP2D.

Figure 24:
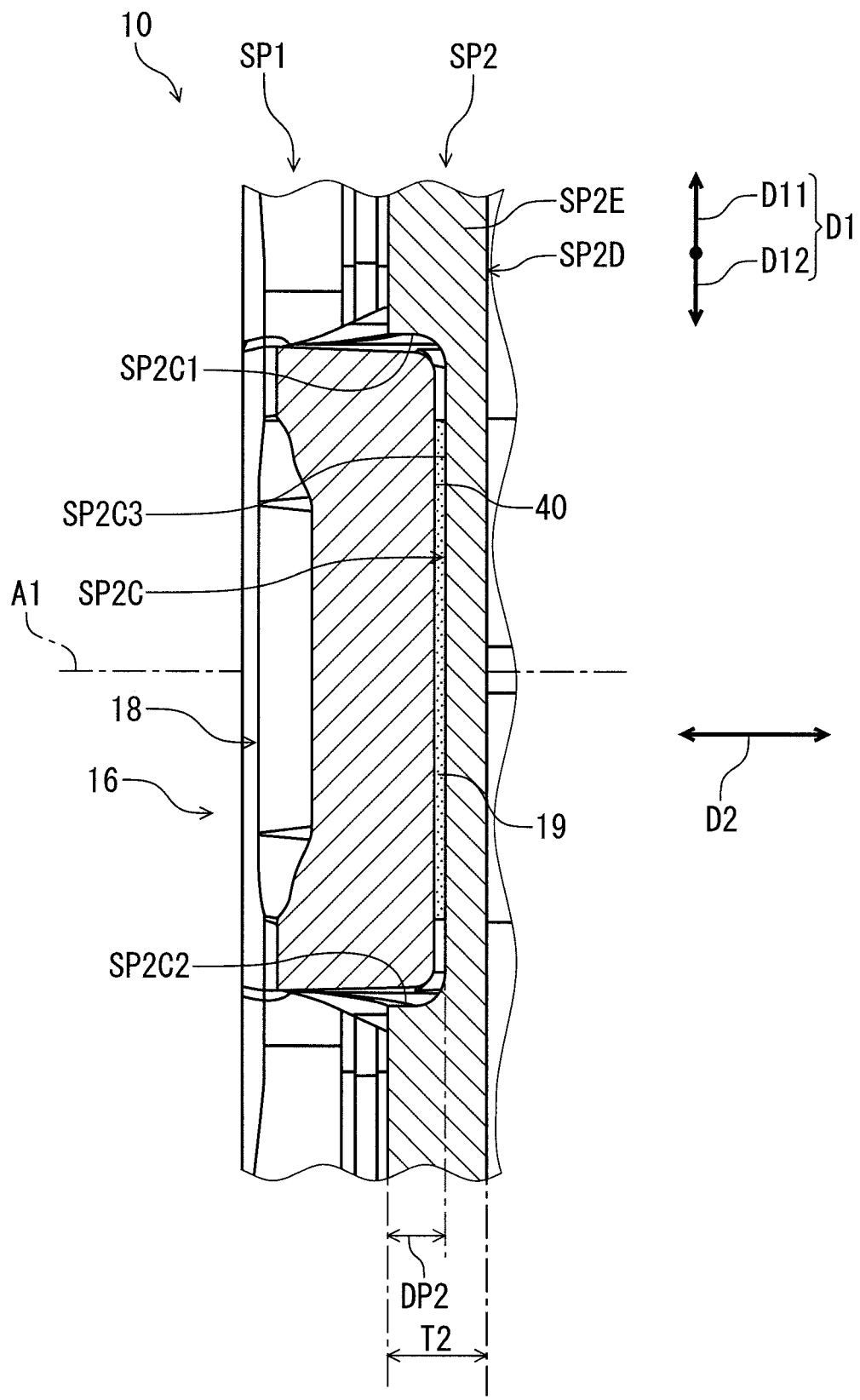
FIG. 24 is a cross-sectional view of the bicycle rear sprocket assembly taken along line XXIV-XXIV of FIG. 4.

As seen in FIG. 24, the at least one second recess SP2C includes a second circumferential surface SP2C1 and a second additional circumferential surface SP2C2. The second additional circumferential surface SP2C2 is spaced apart from the second circumferential surface SP2C1 in the circumferential direction D1 with respect to the rotational center axis A1. The second circumferential surface SP2C1 and the second additional circumferential surface SP2C2 face toward each other in the circumferential direction D1. The sprocket attachment part 16 is provided between the second circumferential surface SP2C1 and the second additional circumferential surface SP2C2 in the circumferential direction D1. The support arm 18 is provided between the second circumferential surface SP2C1 and the second additional circumferential surface SP2C2 in the circumferential direction D1.

The at least one second recess SP2C includes a second axial surface SP2C3 facing in the axial direction D2 with respect to the rotational center axis A1. The second axial surface SP2C3 is provided between the second circumferential surface SP2C1 and the second additional circumferential surface SP2C2 in the circumferential direction D1. The support arm 18 is attached to the second axial surface SP2C3 with the adhesive 19.

The second support attachment part SP2D has a second axial thickness T2 defined in the axial direction D2 with respect to the rotational center axis A1. The at least one second recess SP2C has a second axial depth DP2 defined in the axial direction D2. The second axial thickness T2 is larger than the second axial depth DP2.

Figure 25:
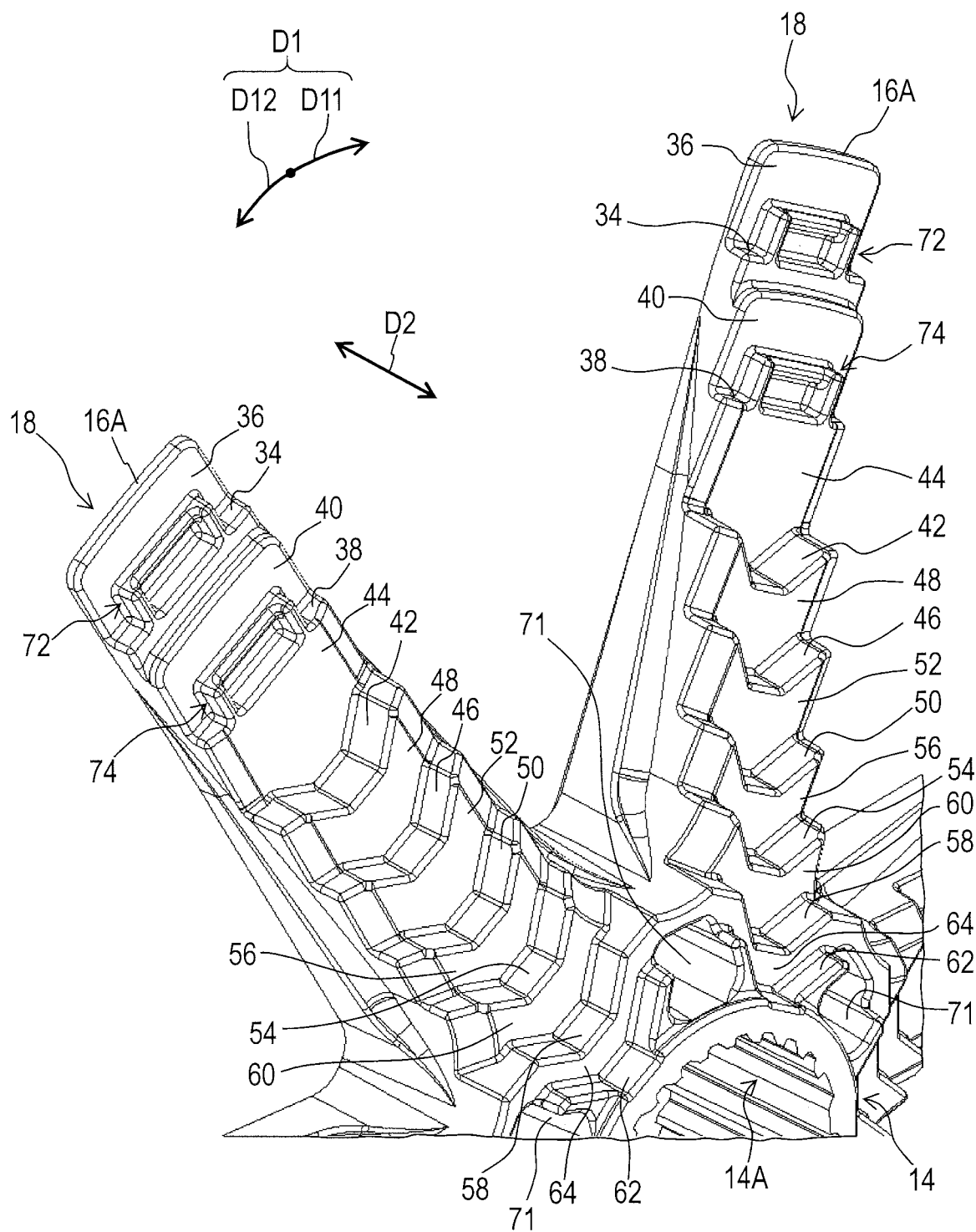
FIG. 25 is a partial perspective view of the sprocket support of the bicycle rear sprocket assembly illustrated in FIG. 1.

As seen in FIG. 25, the sprocket support 12 includes a first radial support surface 34 and a first axial support surface 36. At least one arm of the plurality of support arms 18 includes the first radial support surface 34 and the first axial support surface 36. In this embodiment, each of the support arms 18 includes the first radial support surface 34 and the first axial support surface 36. The first radial support surface 34 faces radially outwardly. The first axial support surface 36 faces in the axial direction D2.

The sprocket support 12 includes a second radial support surface 38 and a second axial support surface 40. The at least one arm of the plurality of support arms 18 includes the second radial support surface 38 and the second axial support surface 40. In this embodiment, each of the support arms 18 includes the second radial support surface 38 and the second axial support surface 40. The second radial support surface 38 faces radially outwardly. The second axial support surface 40 faces in the axial direction D2.

The sprocket support 12 includes a third radial support surface 42 and a third axial support surface 44. The at least one arm of the plurality of support arms 18 includes the third radial support surface 42 and the third axial support surface 44. In this embodiment, each of the support arms 18 includes the third radial support surface 42 and the third axial support surface 44. The third radial support surface 42 faces radially outwardly. The third axial support surface 44 faces in the axial direction D2.

The sprocket support 12 includes a fourth radial support surface 46 and a fourth axial support surface 48. The at least one arm of the plurality of support arms 18 includes the fourth radial support surface 46 and the fourth axial support surface 48. In this embodiment, each of the support arms 18 includes the fourth radial support surface 46 and the fourth axial support surface 48. The fourth radial support surface 46 faces radially outwardly. The fourth axial support surface 48 faces in the axial direction D2.

The sprocket support 12 includes a fifth radial support surface 50 and a fifth axial support surface 52. The at least one arm of the plurality of support arms 18 includes the fifth radial support surface 50 and the fifth axial support surface 52. In this embodiment, each of the support arms 18 includes the fifth radial support surface 50 and the fifth axial support surface 52. The fifth radial support surface 50 faces radially outwardly. The fifth axial support surface 52 faces in the axial direction D2.

The sprocket support 12 includes a sixth radial support surface 54 and a sixth axial support surface 56. The at least one arm of the plurality of support arms 18 includes the sixth radial support surface 54 and the sixth axial support surface 56. In this embodiment, each of the support arms 18 includes the sixth radial support surface 54 and the sixth axial support surface 56. The sixth radial support surface 54 faces radially outwardly. The sixth axial support surface 56 faces in the axial direction D2.

The sprocket support 12 includes a seventh radial support surface 58 and a seventh axial support surface 60. The at least one arm of the plurality of support arms 18 includes the seventh radial support surface 58 and the seventh axial support surface 60. In this embodiment, each of the support arms 18 includes the seventh radial support surface 58 and the seventh axial support surface 60. The seventh radial support surface 58 faces radially outwardly. The seventh axial support surface 60 faces in the axial direction D2.

The sprocket support 12 includes an eighth radial support surface 62 and an eighth axial support surface 64. The at least one arm of the plurality of support arms 18 includes the eighth radial support surface 62 and the eighth axial support surface 64. In this embodiment, each of the support arms 18 includes the eighth radial support surface 62 and the eighth axial support surface 64. The eighth radial support surface 62 faces radially outwardly. The eighth axial support surface 64 faces in the axial direction D2.

Figure 26:
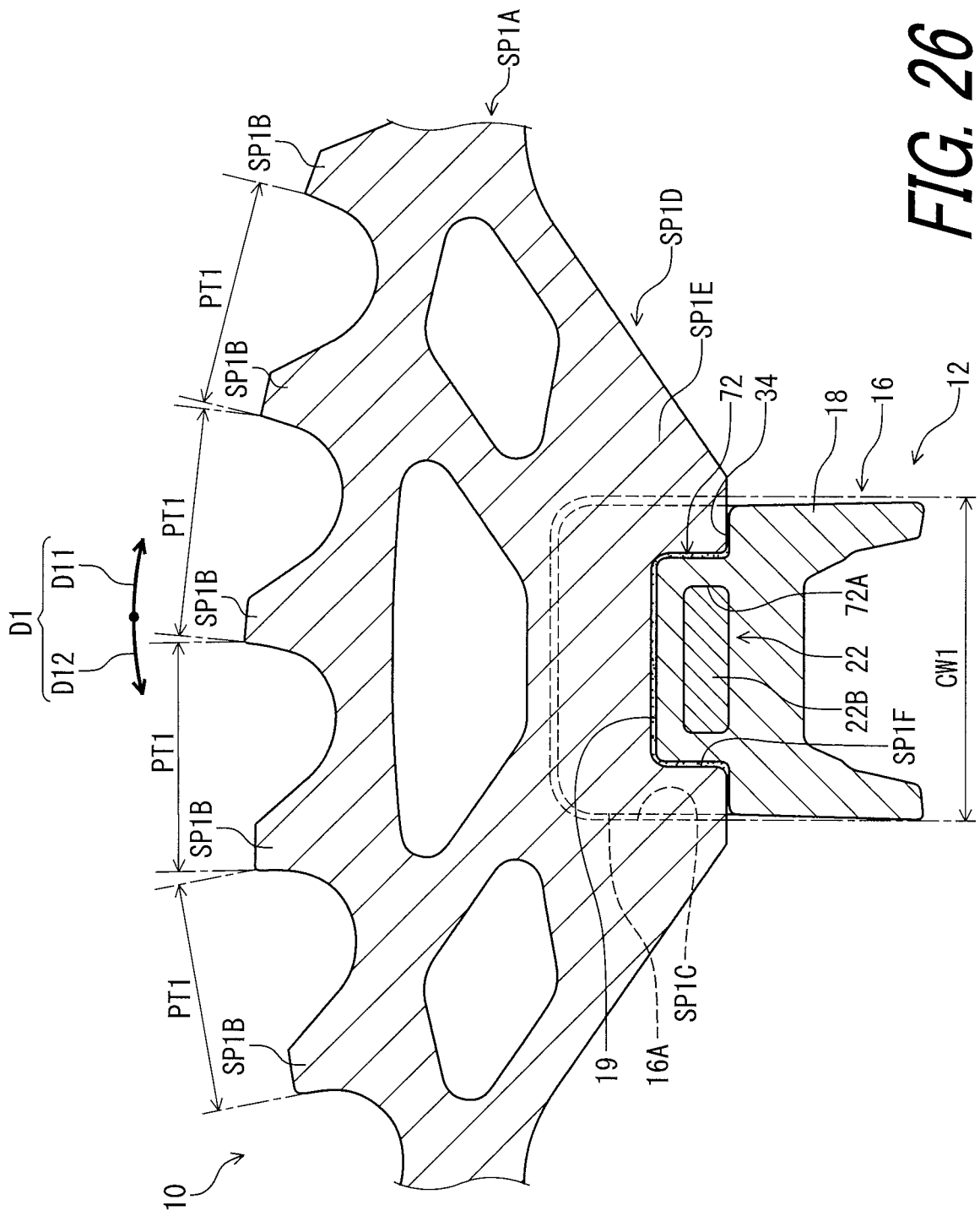
FIG. 26 is a cross-sectional view of the bicycle rear sprocket assembly taken along line XXVI-XXVI of FIG. 4.

As seen in FIGS. 4 and 26, the first sprocket SP1 is attached to at least one of the first radial support surface 34 and the first axial support surface 36. In this embodiment, the first sprocket SP1 is attached to the first radial support surface 34 and the first axial support surface 36. Specifically, the first sprocket SP1 is attached to the first radial support surfaces 34 and the first axial support surfaces 36. The first axial support surface 36 extends radially outwardly from the first radial support surface 34.

As seen in FIG. 26, the at least one first recess SP1C includes a first circumferential width CW1. The plurality of first sprocket teeth SP1B is arranged at a tooth pitch PT1 in the circumferential direction D1 with respect to the rotational center axis A1. The first circumferential width CW1 is larger than the tooth pitch PT1.

Figure 27:
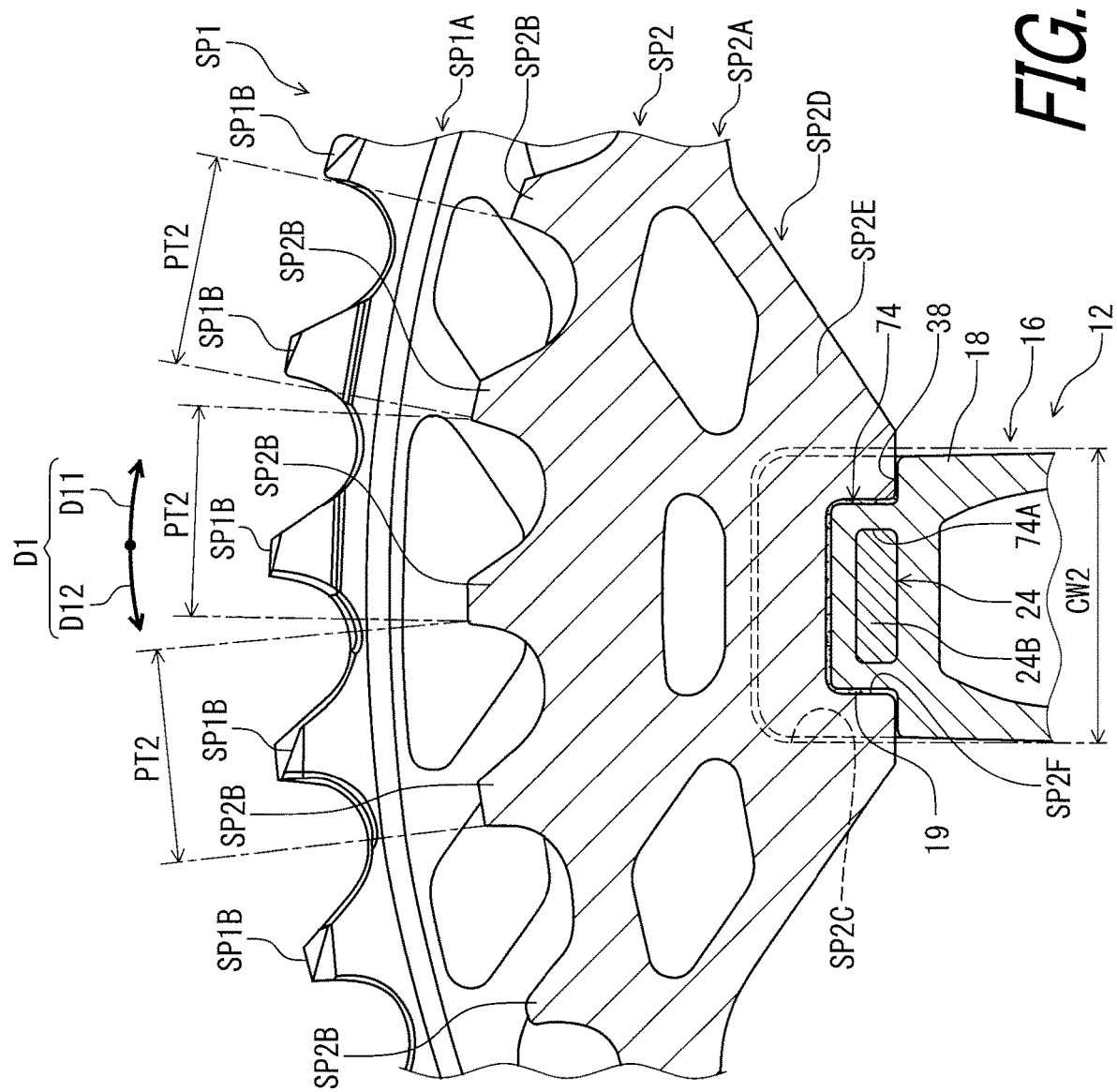
FIG. 27 is a cross-sectional view of the bicycle rear sprocket assembly taken along line XXVII-XXVII of FIG. 4.

As seen in FIGS. 4 and 27, the second sprocket SP2 is attached to at least one of the second radial support surface 38 and the second axial support surface 40. In this embodiment, the second sprocket SP2 is attached to the second radial support surface 38 and the second axial support surface 40. Specifically, the second sprocket SP2 is attached to the second radial support surfaces 38 and the second axial support surfaces 40. The second axial support surface 40 extends radially outwardly from the second radial support surface 38.

As seen in FIG. 27, the at least one second recess SP2C includes a second circumferential width CW2. The plurality of second sprocket teeth SP2B is arranged at a tooth pitch PT2 in the circumferential direction D1 with respect to the rotational center axis A1. The second circumferential width CW2 is larger than the tooth pitch PT2.

As seen in FIG. 4, the third sprocket SP3 is attached to at least one of the third radial support surface 42 and the third axial support surface 44. In this embodiment, the third sprocket SP3 is attached to the third radial support surface 42 and the third axial support surface 44. Specifically, the third sprocket SP3 is attached to the third radial support surfaces 42 and the third axial support surfaces 44. The third axial support surface 44 extends radially outwardly from the third radial support surface 42.

The fourth sprocket SP4 is attached to at least one of the fourth radial support surface 46 and the fourth axial support surface 48. In this embodiment, the fourth sprocket SP4 is attached to the fourth radial support surface 46 and the fourth axial support surface 48. Specifically, the fourth sprocket SP4 is attached to the fourth radial support surfaces 46 and the fourth axial support surfaces 48. The fourth axial support surface 48 extends radially outwardly from the fourth radial support surface 46.

The fifth sprocket SP5 is attached to at least one of the fifth radial support surface 50 and the fifth axial support surface 52. In this embodiment, the fifth sprocket SP5 is attached to the fifth radial support surface 50 and the fifth axial support surface 52. Specifically, the fifth sprocket SP5 is attached to the fifth radial support surfaces 50 and the fifth axial support surfaces 52. The fifth axial support surface 52 extends radially outwardly from the fifth radial support surface 50.

The sixth sprocket SP6 is attached to at least one of the sixth radial support surface 54 and the sixth axial support surface 56. In this embodiment, the sixth sprocket SP6 is attached to the sixth radial support surface 54 and the sixth axial support surface 56. Specifically, the sixth sprocket SP6 is attached to the sixth radial support surfaces 54 and the sixth axial support surfaces 56. The sixth axial support surface 56 extends radially outwardly from the sixth radial support surface 54.

The seventh sprocket SP7 is attached to at least one of the seventh radial support surface 58 and the seventh axial support surface 60. In this embodiment, the seventh sprocket SP7 is attached to the seventh radial support surface 58 and the seventh axial support surface 60. Specifically, the seventh sprocket SP7 is attached to the seventh radial support surfaces 58 and the seventh axial support surfaces 60. The seventh axial support surface 60 extends radially outwardly from the seventh radial support surface 58.

The eighth sprocket SP8 is attached to at least one of the eighth radial support surface 62 and the eighth axial support surface 64. In this embodiment, the eighth sprocket SP8 is attached to the eighth radial support surface 62 and the eighth axial support surface 64. Specifically, the eighth sprocket SP8 is attached to the eighth radial support surfaces 62 and the eighth axial support surfaces 64. The eighth axial support surface 64 extends radially outwardly from the eighth radial support surface 62.

The first radial support surface 34 is provided radially outwardly of the second radial support surface 38. The second radial support surface 38 is provided radially outwardly of the third radial support surface 42. The third radial support surface 42 is provided radially outwardly of the fourth radial support surface 46. The fourth radial support surface 46 is provided radially outwardly of the fifth radial support surface 50. The fifth radial support surface 50 is provided radially outwardly of the sixth radial support surface 54. The sixth radial support surface 54 is provided radially outwardly of the seventh radial support surface 58. The seventh radial support surface 58 is provided radially outwardly of the eighth radial support surface 62.

The first axial support surface 36 is provided radially outwardly of the second axial support surface 40. The second axial support surface 40 is provided radially outwardly of the third axial support surface 44. The third axial support surface 44 is provided radially outwardly of the fourth axial support surface 48. The fourth axial support surface 48 is provided radially outwardly of the fifth axial support surface 52. The fifth axial support surface 52 is provided radially outwardly of the sixth axial support surface 56. The sixth axial support surface 56 is provided radially outwardly of the seventh axial support surface 60. The seventh axial support surface 60 is provided radially outwardly of the eighth axial support surface 64.

As seen in FIG. 22, the first axial support surface 36 is provided in the at least one first recess SP1C. In this embodiment, the first axial support surface 36 is provided in the first recess SP1C. The first axial support surface 36 faces toward the first axial surface SP and is attached to the first axial surface SP1C3.

As seen in FIG. 24, the second axial support surface 40 is provided in the at least one second recess SP2C. In this embodiment, the second axial support surface 40 is provided in the second recess SP2C. The second axial support surface 40 faces toward the second axial surface SP2C3 and is attached to the second axial surface SP2C3.

Figure 28:
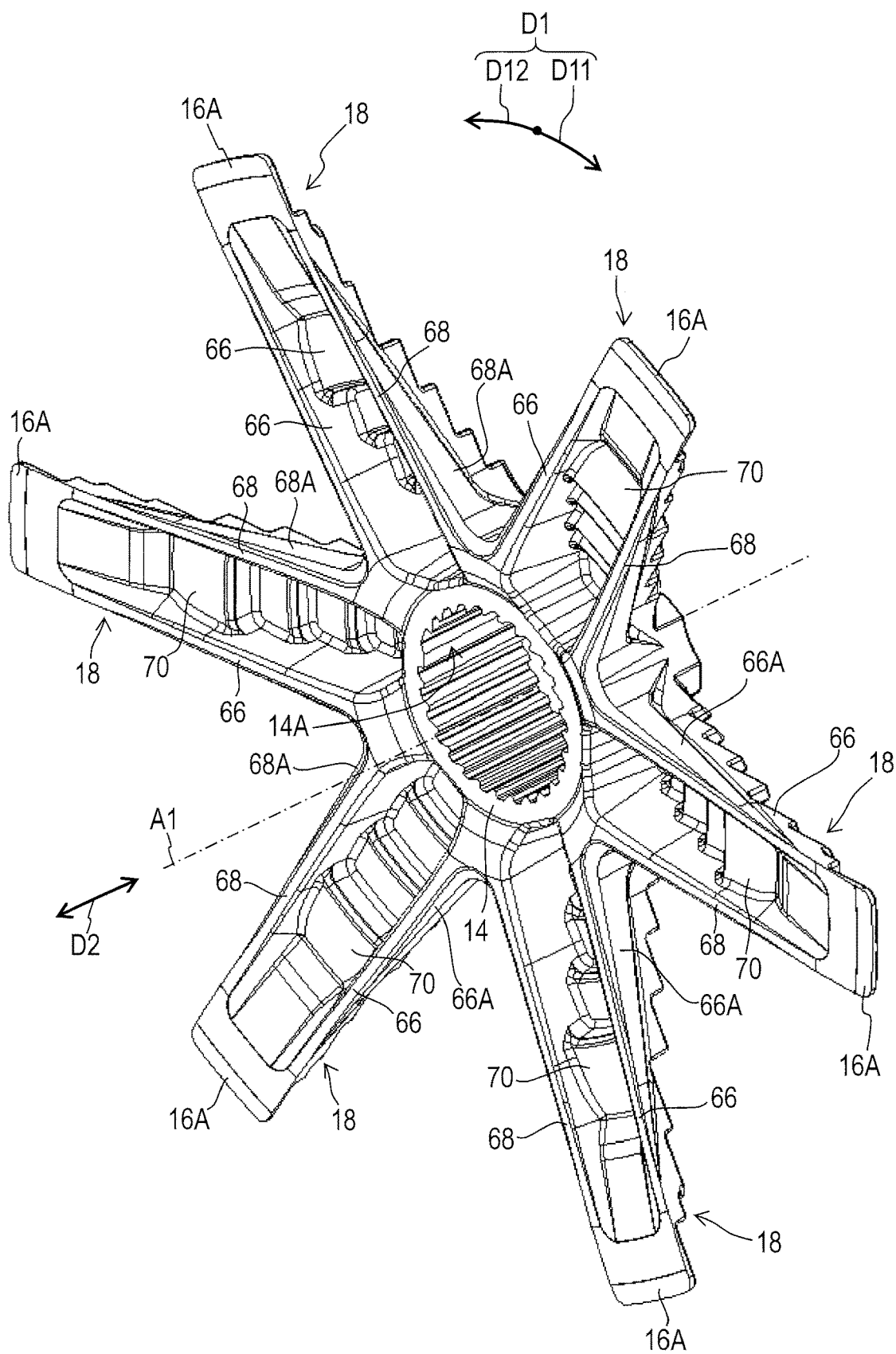
FIG. 28 is a perspective view of the sprocket support of the bicycle rear sprocket assembly illustrated in FIG. 1.

As seen in FIG. 28, at least one arm of the plurality of support arms 18 includes a first wall 66, a second wall 68, and an attachment wall 70. In this embodiment, each of the support arms 18 includes the first wall 66, the second wall 68, and the attachment wall 70. The first wall 66 is spaced apart from the second wall 68 in the circumferential direction D1 with respect to the rotational center axis A1. The first wall 66 and the second wall 68 extends from the attachment wall 70 in the axial direction D2 with respect to the rotational center axis A1. As seen in FIG. 4, the first sprocket SP1 and the second sprocket SP2 are attached to the attachment wall 70. The third to eighth sprockets SP3 to SP8 are attached to the attachment wall 70.

Figure 29:
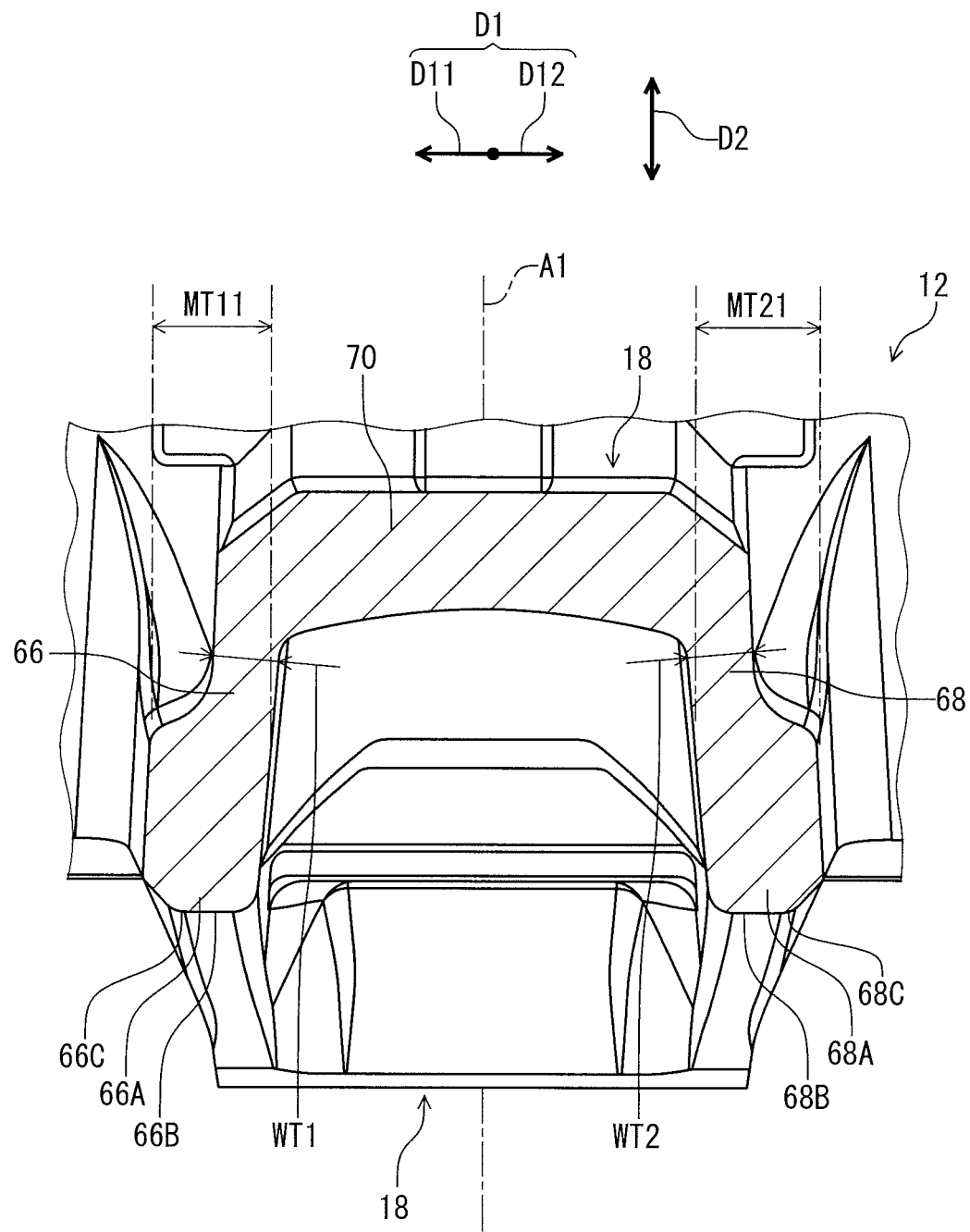
FIG. 29 is a cross-sectional view of the sprocket support of the bicycle rear sprocket assembly taken along line XXIX-XXIX of FIG. 30.
Figure 30:
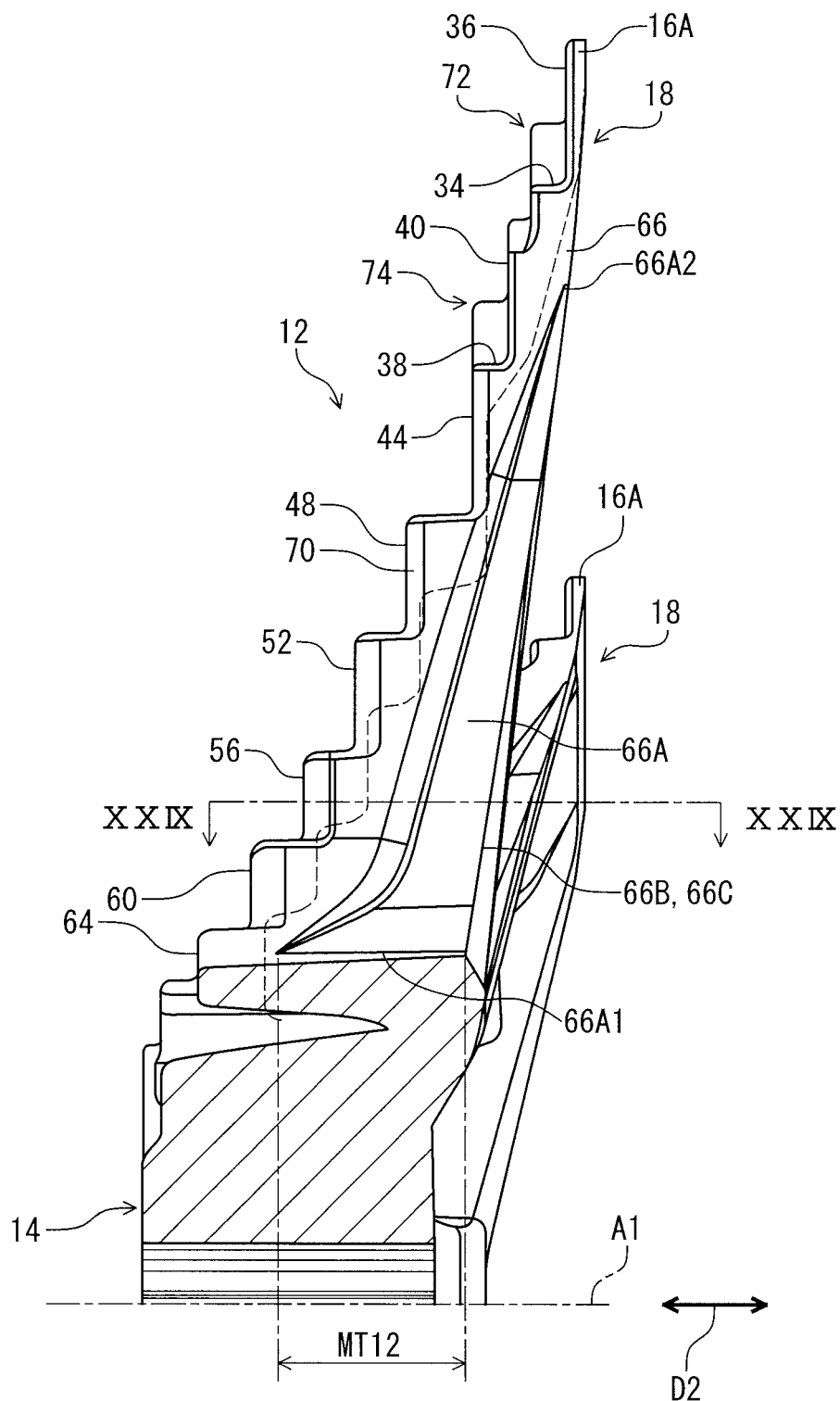
FIG. 30 is a partial front view of the sprocket support of the bicycle rear sprocket assembly illustrated in FIG. 1.

As seen in FIGS. 29 and 30, the first wall 66 includes a first reinforcement part 66A. The first reinforcement part 66A has at least one of a first maximum circumferential thickness MT11 and a first maximum axial thickness MT12. In this embodiment, the first reinforcement part 66A has the first maximum circumferential thickness MT11 and the first maximum axial thickness MT12.

As seen in FIG. 29, the first maximum circumferential thickness MT11 is defined in the circumferential direction D1. The first maximum circumferential thickness MT11 is larger than a thickness WT1 of another part of the first wall 66. As seen in FIG. 30, the first maximum axial thickness MT12 is defined in the axial direction D2. The first reinforcement part 66A is provided closer to an axial end 66B of the first wall 66 than the attachment wall 70 in the axial direction D2. At least one of the first maximum circumferential thickness MT11 and the first maximum axial thickness MT12 is defined at an axially end part 66C of the first reinforcement part 66A. In this embodiment, the first maximum circumferential thickness MT11 is defined at the axially end part 66C of the first reinforcement part 66A.

As seen in FIG. 30, the first reinforcement part 66A is provided radially closer to the hub engagement part 14 than the radially outer end 16A of the at least one arm of the plurality of support arms 18. The at least one of first maximum circumferential thickness MT11 and the first maximum axial thickness MT12 is defined at a radially inner part 66A1 of the first reinforcement part 66A. In this embodiment, the first maximum axial thickness MT12 is defined at the radially inner part 66A1 of the first reinforcement part 66A. An axial thickness of the first reinforcement part 66A gradually increases from a radially outer part 66A2 of the first reinforcement part 66A to the radially inner part 66A1 of the first reinforcement part 66A. An axial thickness of the first wall 66 gradually increases from the radially outer end 16A of the support arm 18 to the hub engagement part 14.

Figure 31:
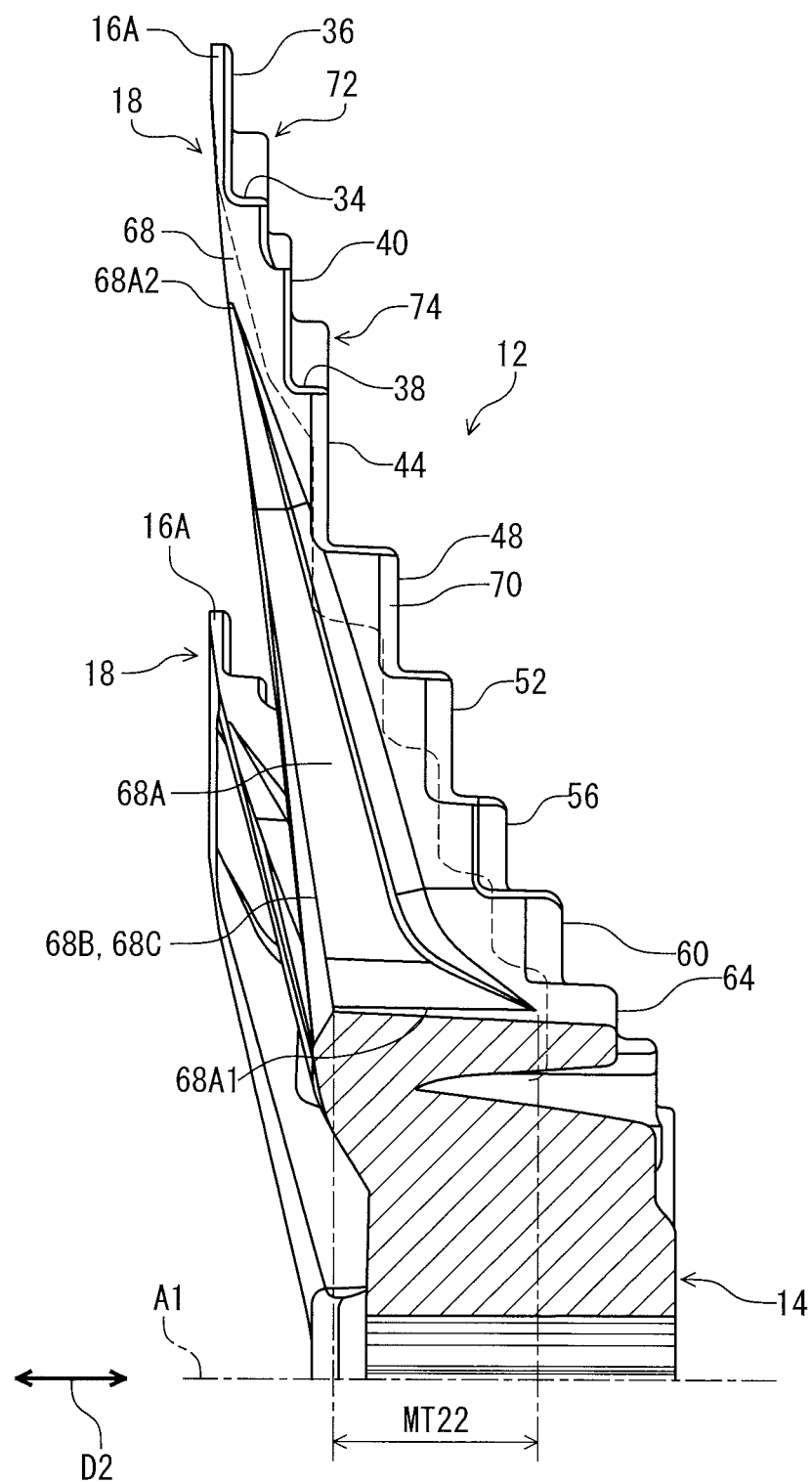
FIG. 31 is a partial rear view of the sprocket support of the bicycle rear sprocket assembly illustrated in FIG. 1.

As seen in FIGS. 29 and 31, the second wall 68 includes a second reinforcement part 68A. The second reinforcement part 68A has at least one of a second maximum circumferential thickness MT21 and a second maximum axial thickness MT22. In this embodiment, the second reinforcement part 68A has the second maximum circumferential thickness MT21 and the second maximum axial thickness MT22.

As seen in FIG. 29, the second maximum circumferential thickness MT21 is defined in the circumferential direction D1. The second maximum circumferential thickness MT21 is larger than a thickness WT2 of another part of the second wall 68. As seen in FIG. 31, the second maximum axial thickness MT22 is defined in the axial direction D2. The second reinforcement part 68A is provided closer to an axial end 68B of the second wall 68 than the attachment wall 70 in the axial direction D2. At least one of the second maximum circumferential thickness MT21 and the second maximum axial thickness MT22 is defined at an axially end part 68C of the second reinforcement part 68A. In this embodiment, the second maximum circumferential thickness MT21 is defined at the axially end part 68C of the second reinforcement part 68A.

As seen in FIG. 31, the second reinforcement part 68A is provided radially closer to the hub engagement part 14 than the radially outer end 16A of the at least one arm of the plurality of support arms 18. The at least one of second maximum circumferential thickness MT21 and the second maximum axial thickness MT22 is defined at a radially inner part 68A1 of the second reinforcement part 68A. In this embodiment, the second maximum axial thickness MT22 is defined at the radially inner part 68A1 of the second reinforcement part 68A. An axial thickness of the second reinforcement part 68A gradually increases from a radially outer part 68A2 of the second reinforcement part 68A to the radially inner part 68A1 of the second reinforcement part 68A. An axial thickness of the second wall 68 gradually increases from the radially outer end 16A of the support arm 18 to the hub engagement part 14.

Figure 32:
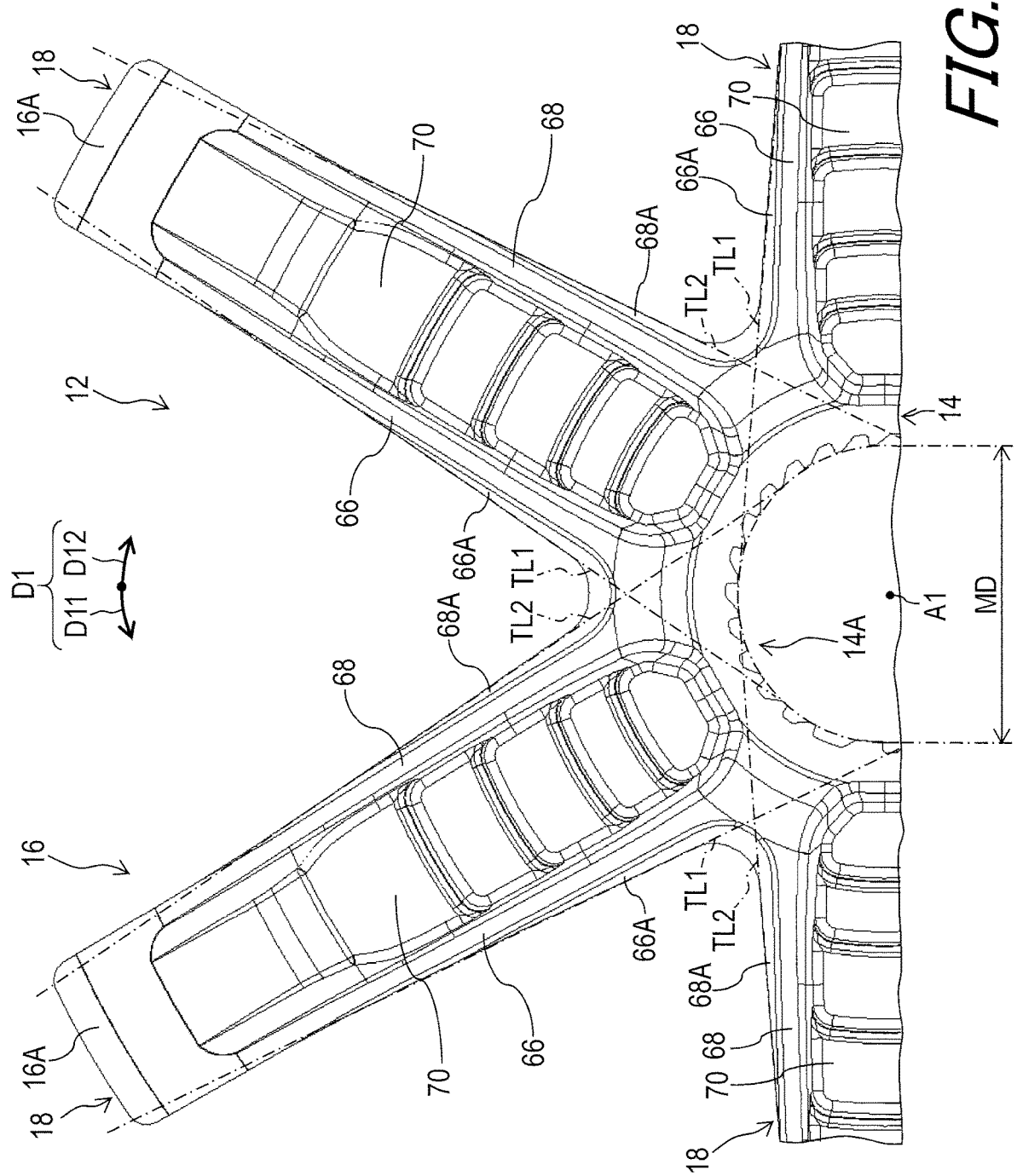
FIG. 32 is a partial side elevational view of the sprocket support of the bicycle rear sprocket assembly illustrated in FIG. 1.

As seen in FIG. 32, a circumferential thickness of the first wall 66 gradually increases from the radially outer end 16A of the support arm 18 to the hub engagement part 14. A circumferential thickness of the second wall 68 gradually increases from the radially outer end 16A of the support arm 18 to the hub engagement part 14.

The first wall 66 extends along a first tangential line TL1 of the internal spline 14A of the hub engagement part 14 when viewed from the rotational center axis A1. The second wall 68 extends along a second tangential line TL2 of the internal spline 14A when viewed from the rotational center axis A1. Each of the first tangential line TL1 and the second tangential line TL2 is a tangential line of a circle having an internal major diameter MD. The first tangential line TL1 substantially coincides with an outline of the first reinforcement part 66A when viewed from the rotational center axis A1. The second tangential line TL2 substantially coincides with an outline of the second reinforcement part 68A when viewed from the rotational center axis A1.

Figure 33:
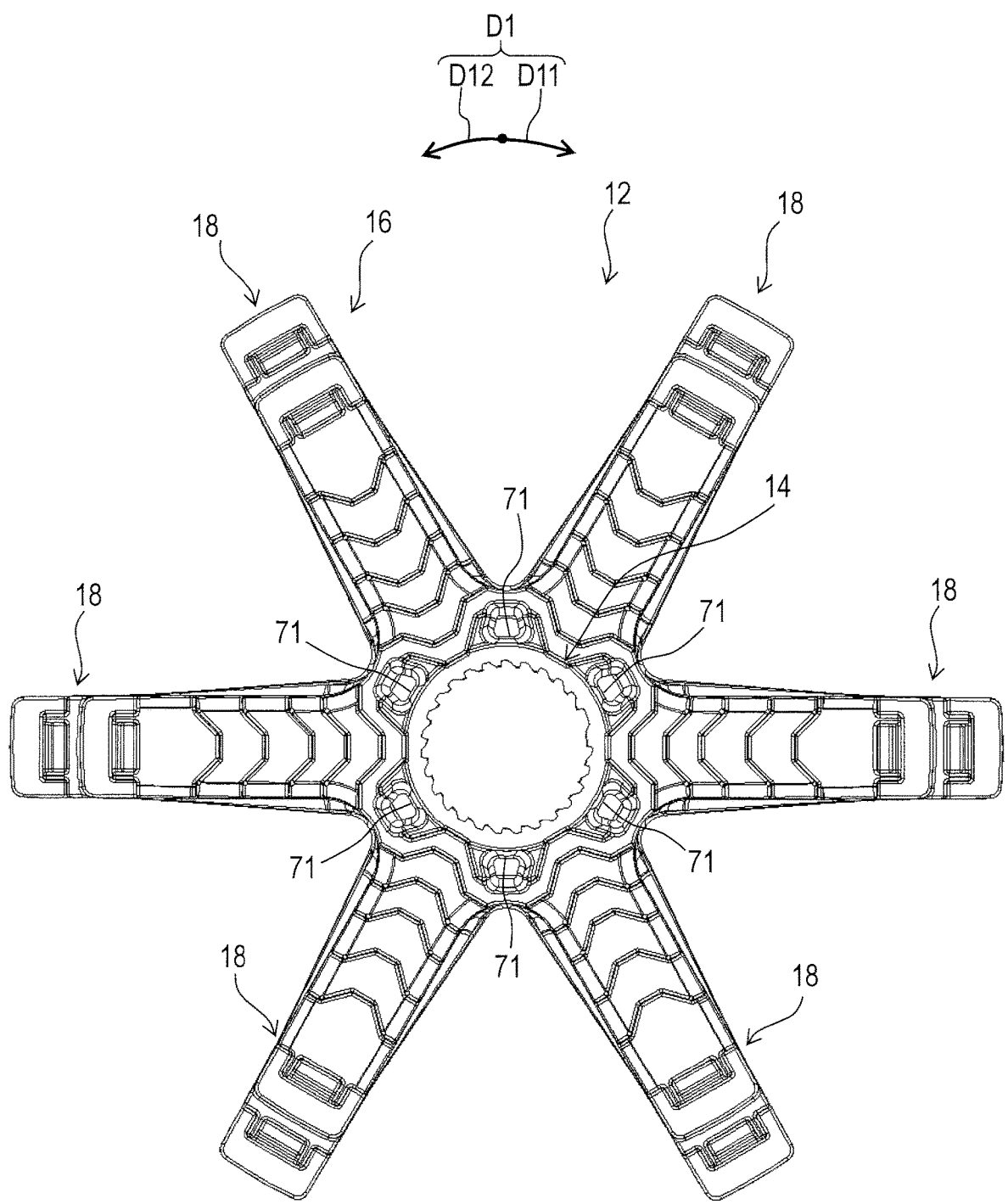
FIG. 33 is a side elevational view of the sprocket support of the bicycle rear sprocket assembly illustrated in FIG. 1.

As seen in FIGS. 25 and 33, the sprocket support 12 includes a plurality of holes 71. The hole 71 is provided radially outwardly of the hub engagement part 14. The hole 71 is provided between adjacent two arms of the plurality of support arms 18 in the circumferential direction D1.

Figure 34:
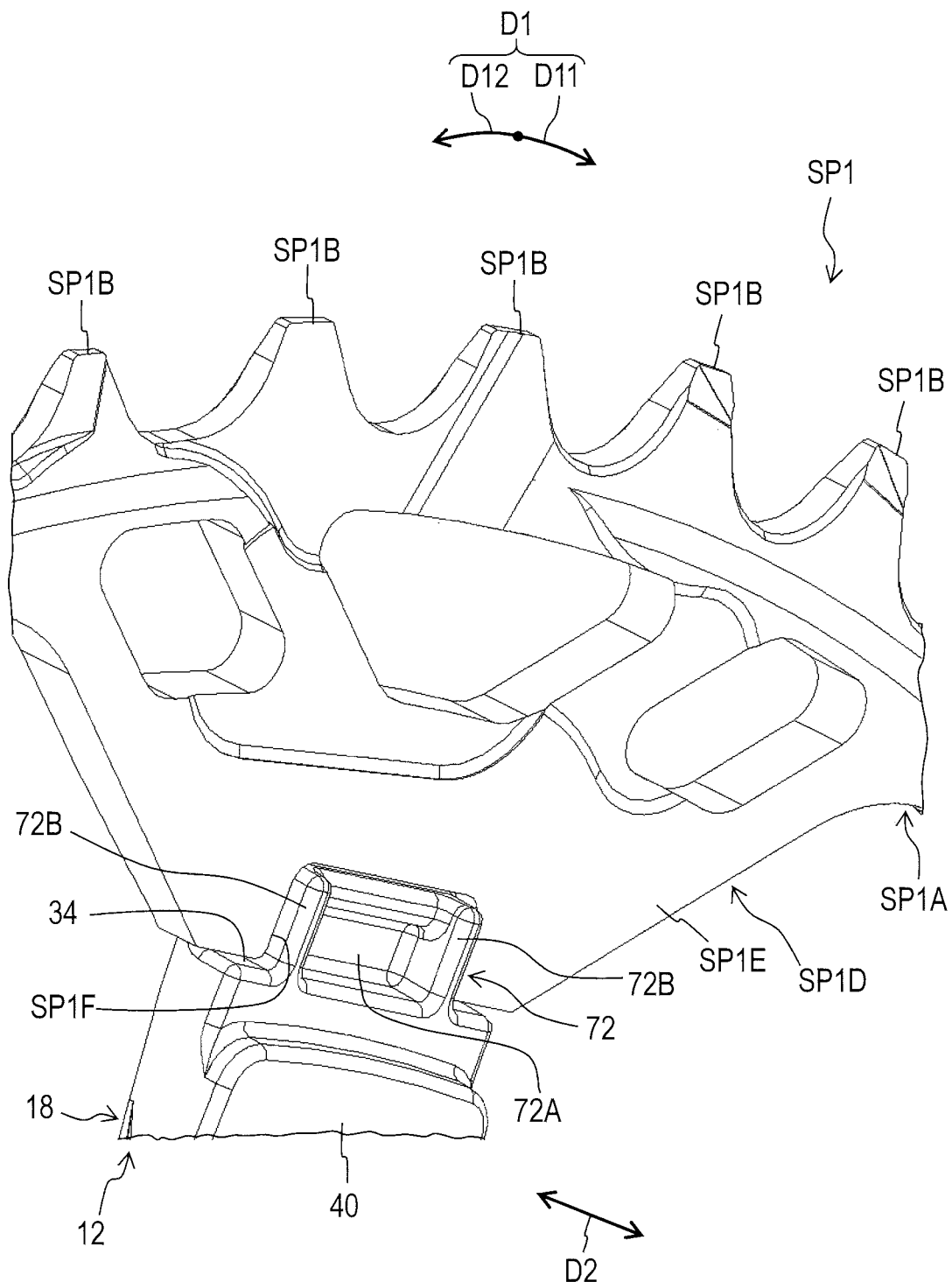
FIG. 34 is a partial perspective view of the first sprocket and the sprocket support of the bicycle rear sprocket assembly illustrated in FIG. 1.

As seen in FIG. 20, the first support attachment part SP1D includes a first attachment opening SP1F. The first attachment opening SP1F is provided in the first recess SP1C. As seen in FIG. 34, the support arm 18 is provided in the first attachment opening SP1F. The support arm 18 includes a first restriction part 72 provided in the first attachment opening SP1F. As seen in FIG. 25, the first restriction part 72 is provided on the first radial support surface 34 and the first axial support surface 36. The first restriction part 72 extends radially outwardly from the first radial support surface 34. The first restriction part 72 extends from the first axial support surface 36 in the axial direction D2.

As seen in FIG. 34, the first restriction part 72 includes a first attachment recess 72A and a pair of first ribs 72B. The first attachment recess 72A is provided between the pair of first ribs 72B in the circumferential direction D1. The first rib 72B extends from the first axial support surface 36 in the axial direction D2.

Figure 35:
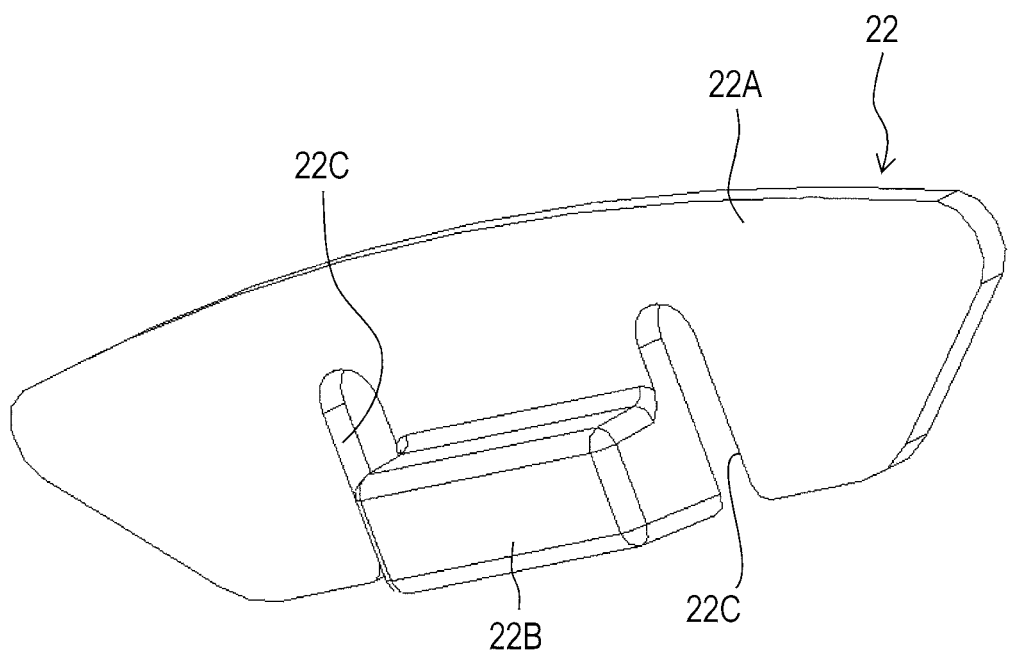
FIG. 35 is a perspective view of a first spacer of the bicycle rear sprocket assembly illustrated in FIG. 1.
Figure 36:
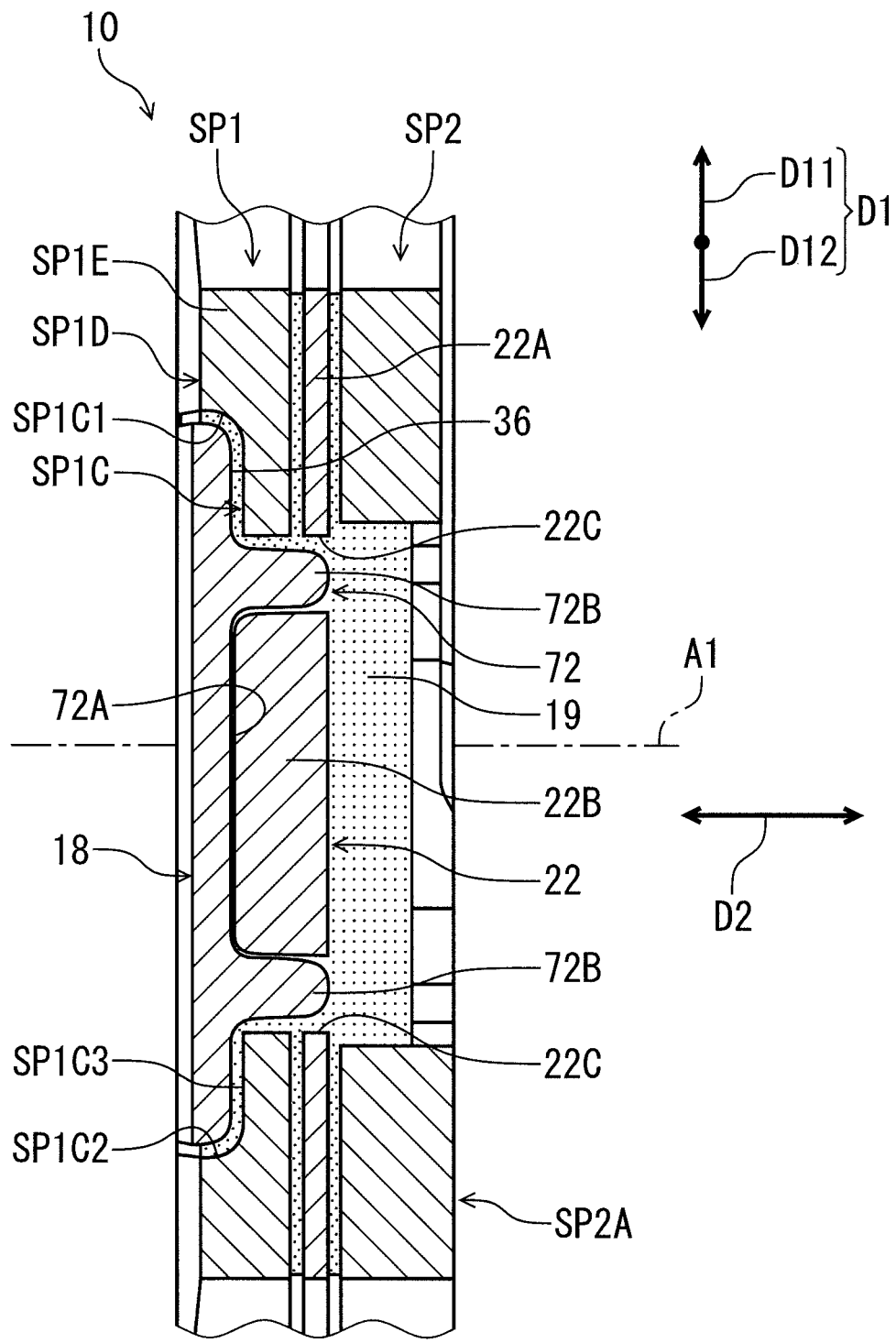
FIG. 36 is a cross-sectional view of the bicycle rear sprocket assembly taken along line XXXVI-XXXVI of FIG. 4.
Figure 37:
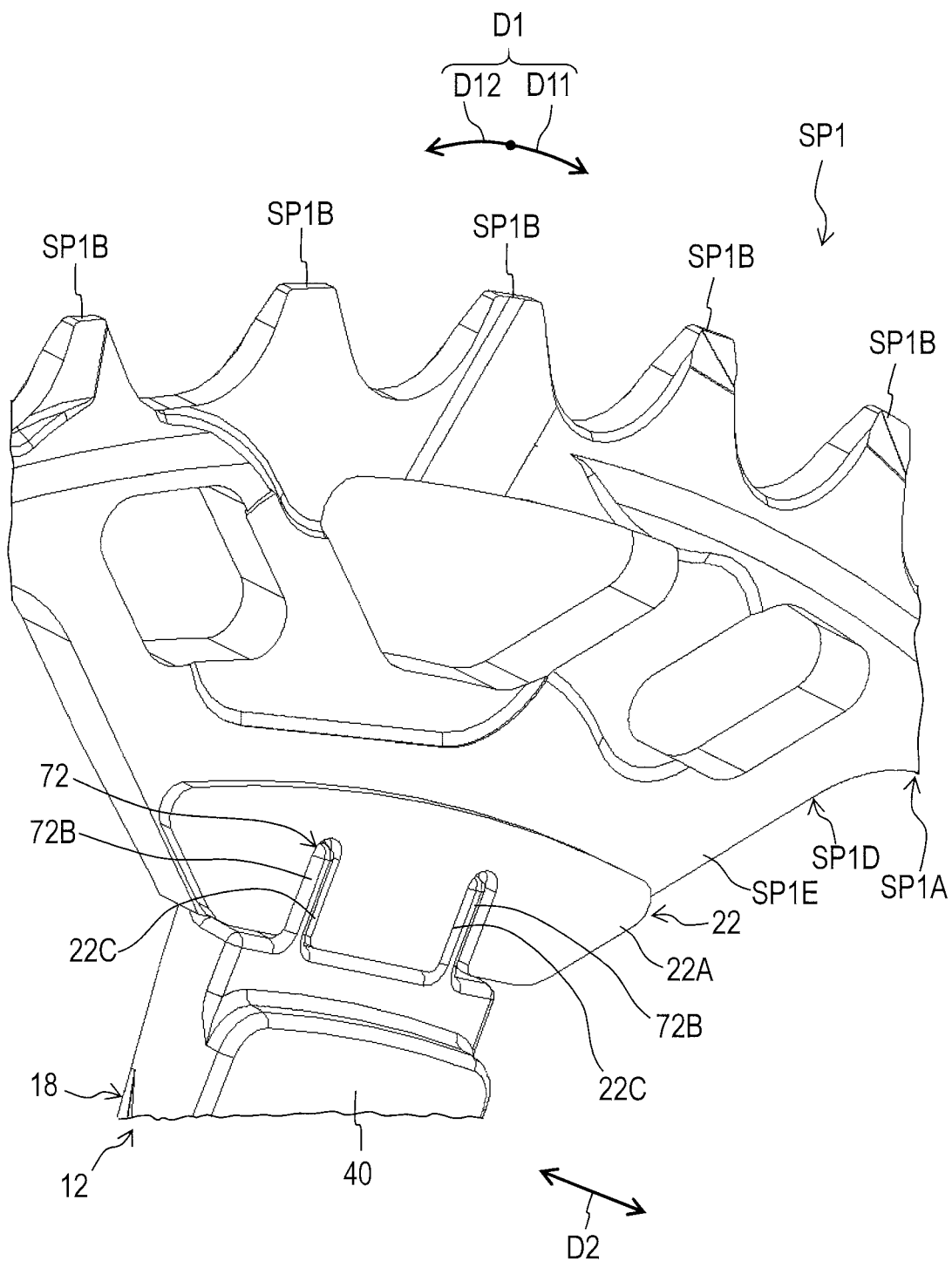
FIG. 37 is a partial perspective view of the first sprocket, the sprocket support, and the first spacer of the bicycle rear sprocket assembly illustrated in FIG. 1.

As seen in FIG. 35, the first spacer 22 includes a first plate 22A and a first protrusion 22B. The first protrusion 22B extends from the first plate 22A. The first plate 22A includes a pair of first slits 22C. The first protrusion 22B is provided between the pair of first slits 22C. As seen in FIGS. 26 and 35, the first protrusion 22B is provided in the first attachment recess 72A. As seen in FIGS. 35 and 36, the first rib 72B is provided in the first slit 22C.

As seen in FIG. 4, the first plate 22A is provided between the first sprocket SP1 and the second sprocket SP2 in the axial direction D2. The first spacer 22 is attached to the first sprocket SP1 and the support arm 18 with a bonding structure such as adhesive. The second sprocket SP2 is attached to the first spacer 22 and the support arm 18 with a bonding structure such as adhesive.

Figure 38:
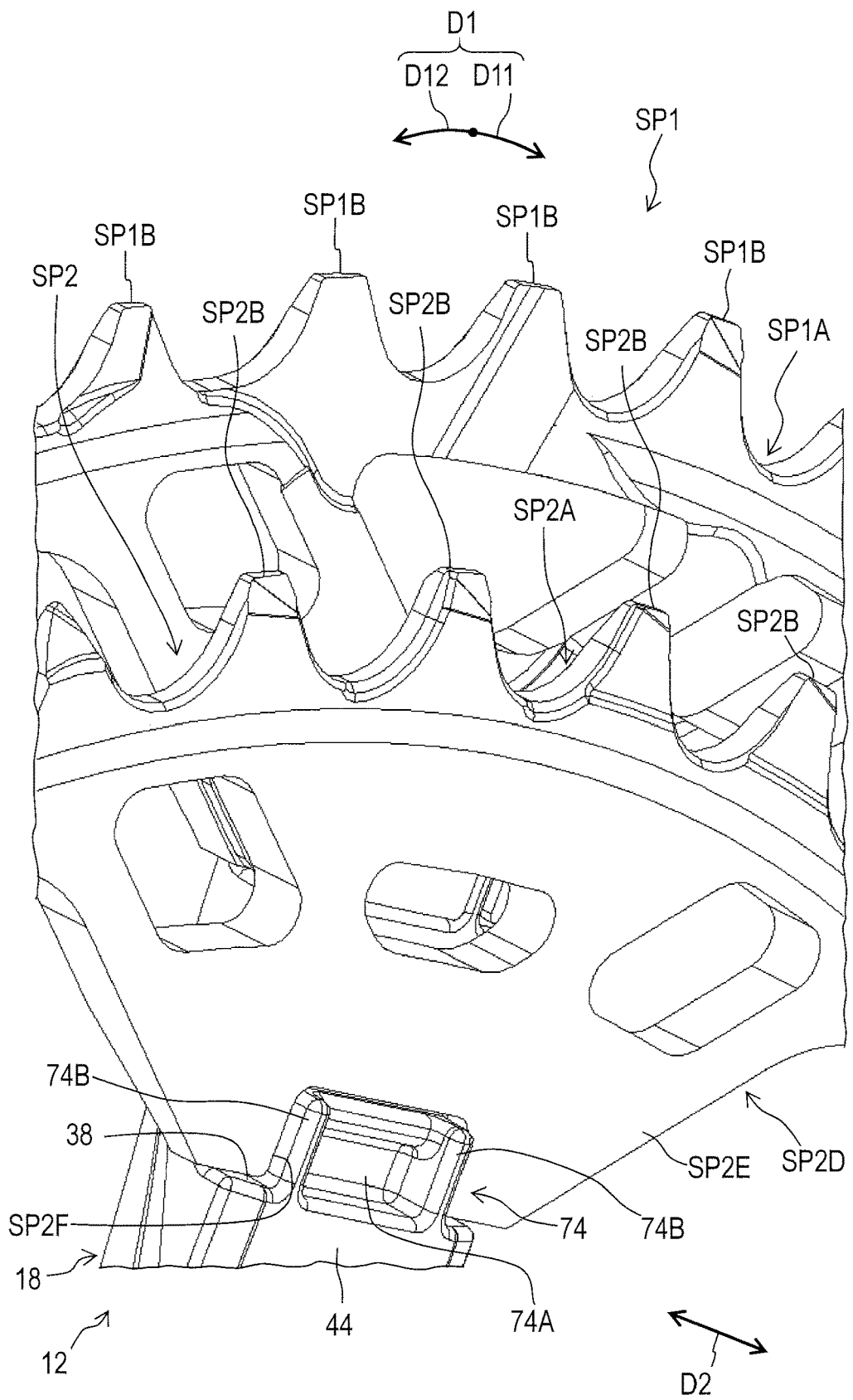
FIG. 38 is a partial perspective view of the first sprocket, the second sprocket, and the sprocket support of the bicycle rear sprocket assembly illustrated in FIG. 1.

As seen in FIG. 23, the second support attachment part SP2D includes a second attachment opening SP2F. The second attachment opening SP2F is provided in the second recess SP2C. As seen in FIG. 38, the support arm 18 is provided in the second attachment opening SP2F. The support arm 18 includes a second restriction part 74 provided in the second attachment opening SP2F. As seen in FIG. 27, the second restriction part 74 is provided on the second radial support surface 38 and the second axial support surface 40. The second restriction part 74 extends radially outwardly from the second radial support surface 38. The second restriction part 74 extends from the second axial support surface 40 in the axial direction D2.

As seen in FIG. 38, the second restriction part 74 includes a second attachment recess 74A and a pair of second ribs 74B. The second attachment recess 74A is provided between the pair of second ribs 74B in the circumferential direction D1. The second rib 74B extends from the second axial support surface 40 in the axial direction D2.

Figure 39:
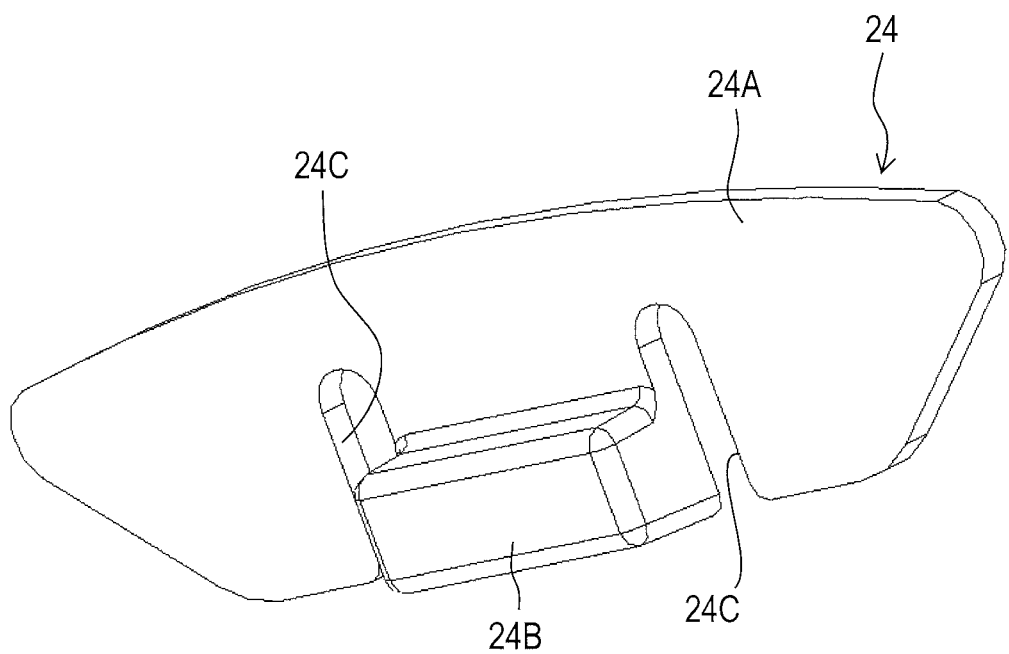
FIG. 39 is a perspective view of a second spacer of the bicycle rear sprocket assembly illustrated in FIG. 1.
Figure 40:
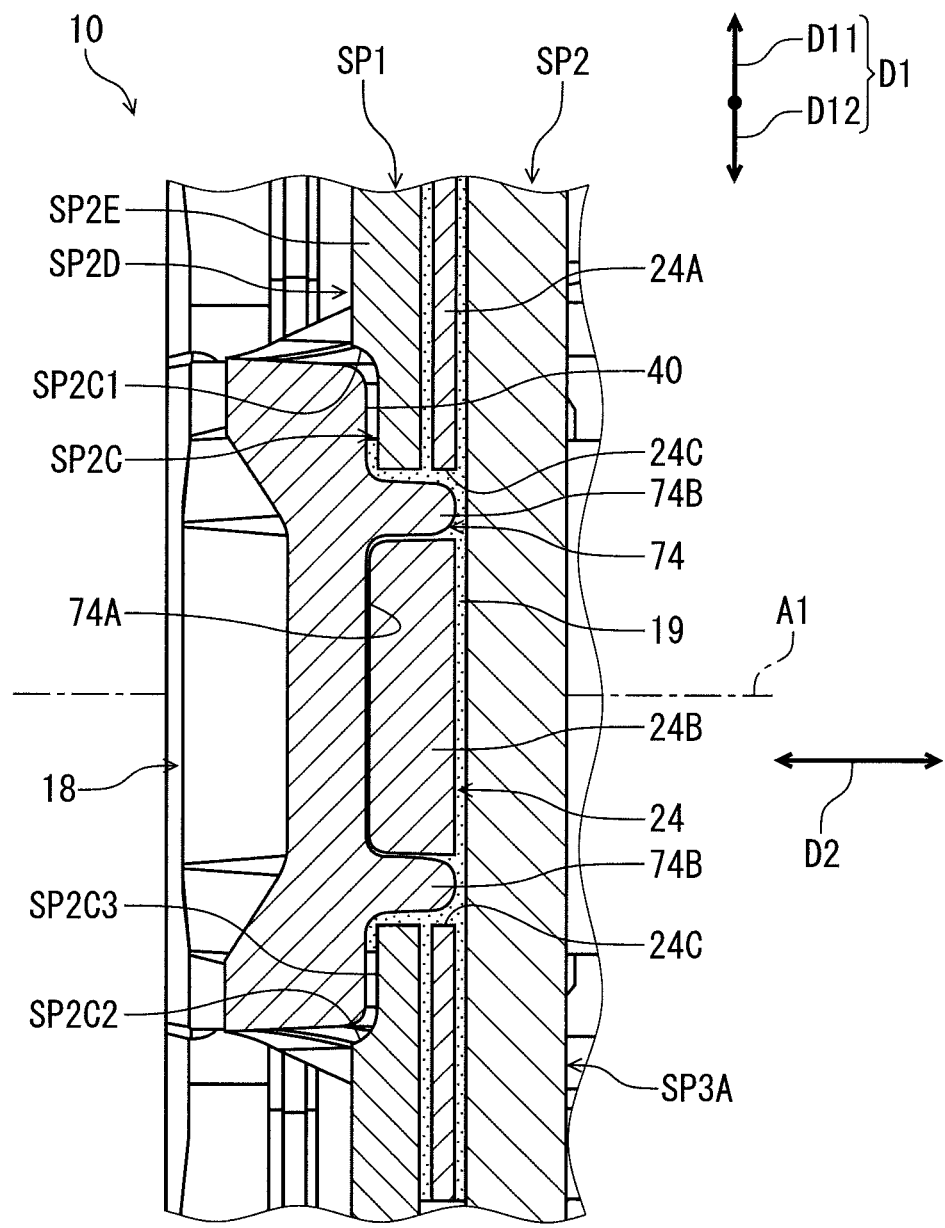
FIG. 40 is a cross-sectional view of the bicycle rear sprocket assembly taken along line XL-XL of FIG. 4.
Figure 41:
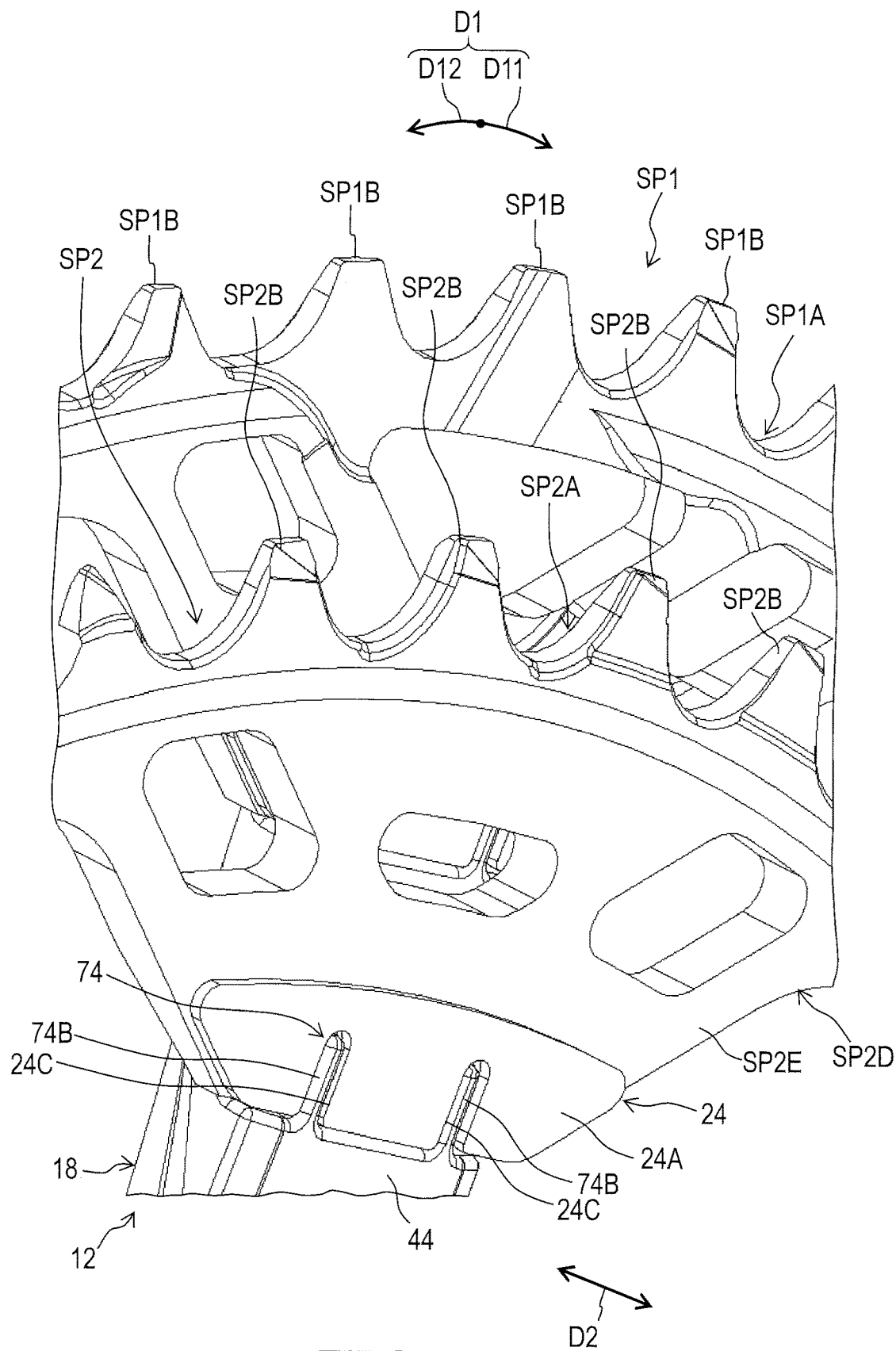
FIG. 41 is a partial perspective view of the first sprocket, the second sprocket, the sprocket support, and the second spacer of the bicycle rear sprocket assembly illustrated in FIG. 1.

As seen in FIG. 39, the second spacer 24 includes a second plate 24A and a second protrusion 24B. The second protrusion 24B extends from the second plate 24A. The second plate 24A includes a pair of second slits 24C. The second protrusion 24B is provided between the pair of second slits 24C. As seen in FIGS. 27 and 39, the second protrusion 24B is provided in the second attachment recess 74A. As seen in FIGS. 39 and 40, the second rib 74B is provided in the second slit 24C.

As seen in FIG. 4, the second plate 24A is provided between the second sprocket SP2 and the third sprocket SP3 in the axial direction D2. The second spacer 24 is attached to the second sprocket SP2 and the support arm 18 with a bonding structure such as adhesive. The third sprocket SP3 is attached to the second spacer 24 and the support arm 18 with a bonding structure such as adhesive.

As seen in FIG. 8, the third sprocket body SP3A includes a plurality of third attachment portions SP3E arranged at a third pitch in the circumferential direction D1. A total number of the third attachment portions SP3E is equal to the total number of the support arms 18. However, the total number of the third attachment portions SP3E is not limited to this embodiment. At least one of the third attachment portions SP3E can be omitted from the third sprocket SP3.

Figure 42:
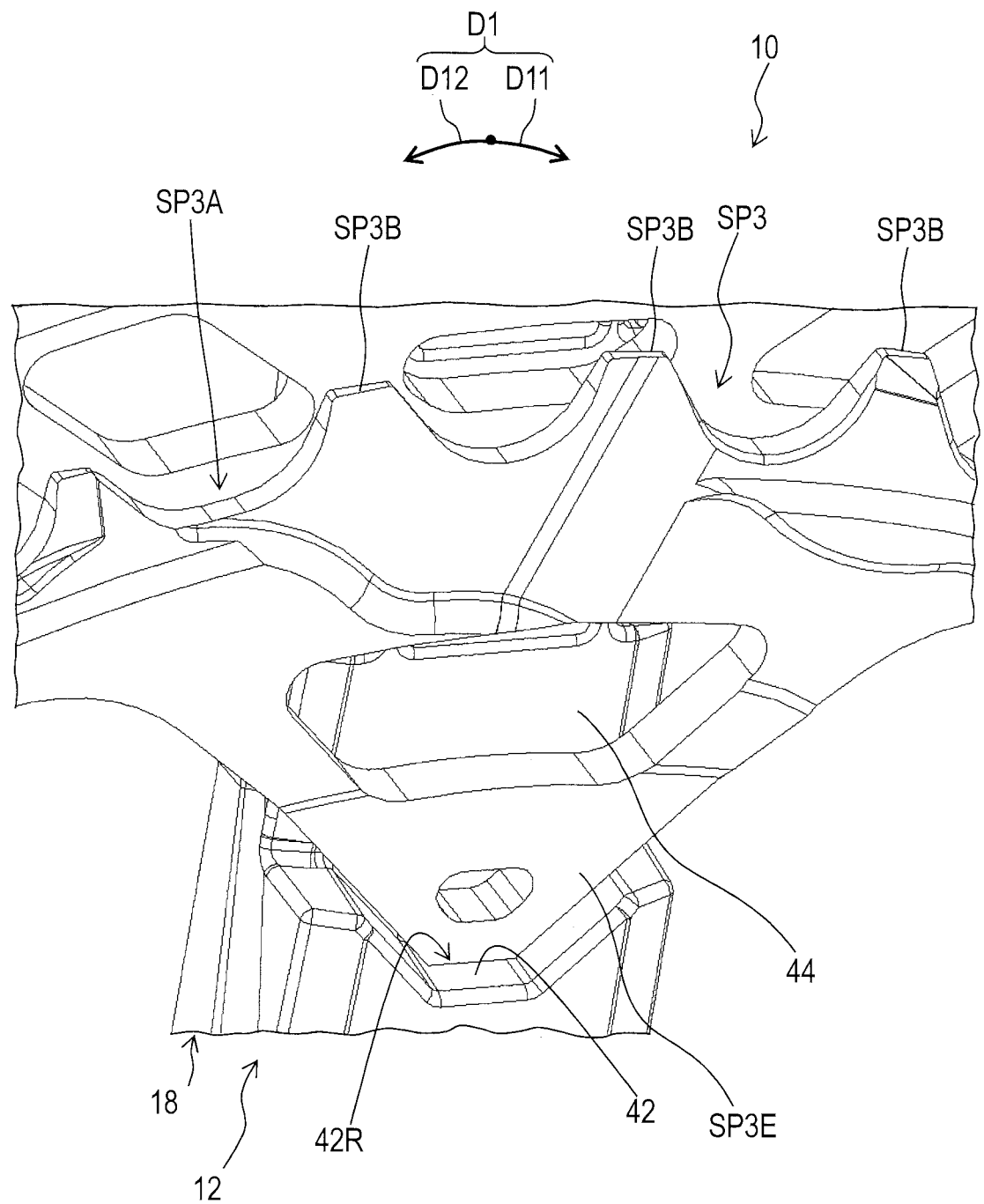
FIG. 42 is a partial perspective view of the second sprocket, the third sprocket, and the sprocket support of the bicycle rear sprocket assembly illustrated in FIG. 1.
Figure 43:
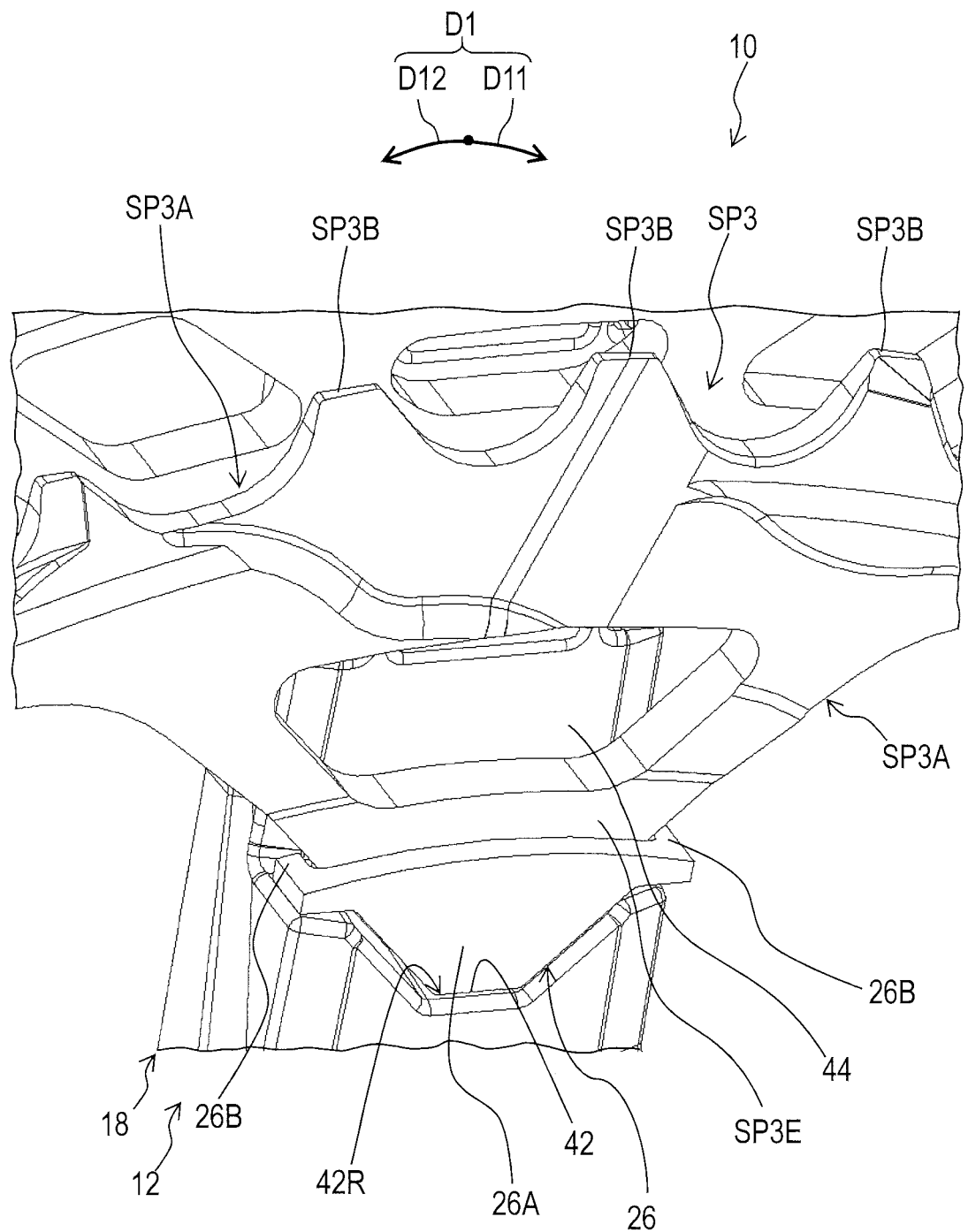
FIG. 43 is a partial perspective view of the second sprocket, the third sprocket, the sprocket support, and a third spacer of the bicycle rear sprocket assembly illustrated in FIG. 1.

As seen in FIG. 42, the third attachment portion SP3E is provided in a holding recess 42R defined by the third radial support surface 42. As seen in FIG. 43, the third spacer 26 is provided in the holding recess 42R.

Figure 44:
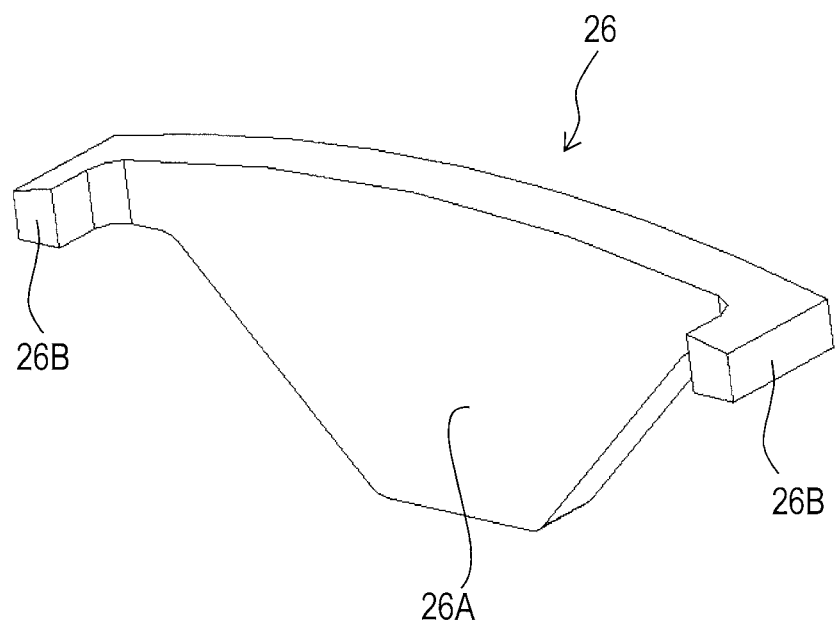
FIG. 44 is a perspective view of the third spacer of the bicycle rear sprocket assembly illustrated in FIG. 1.

As seen in FIG. 44, the third spacer 26 includes a third plate 26A and a pair of third projections 26B. The third projections 26B are spaced apart from each other and extend from the third plate 26A. As seen in FIG. 43, the third plate 26A is provided in the holding recess 42R. The third attachment portion SP3E is provided between the pair of third projections 26B.

As seen in FIG. 4, the third plate 26A is provided between the third sprocket SP3 and the fourth sprocket SP4 in the axial direction D2. The third spacer 26 is attached to the third sprocket SP3 and the support arm 18 with a bonding structure such as adhesive. The fourth sprocket SP4 is attached to the third spacer 26 and the support arm 18 with a bonding structure such as adhesive.

The fourth to seventh spacers 28 to 33 have substantially the same structure as that of the third spacer 26. As seen in FIG. 9, the fourth sprocket body SP4A includes a plurality of fourth attachment portions SP4E. As seen in FIG. 10, the fifth sprocket body SP5A includes a plurality of fifth attachment portions SP5E. As seen in FIG. 11, the sixth sprocket body SP6A includes a plurality of sixth attachment portions SP6E. As seen in FIG. 12, the seventh sprocket body SP7A includes a plurality of seventh attachment portions SP7E. As seen in FIG. 13, the eighth sprocket body SP8A includes a plurality of eighth attachment portions SP8E. The fourth to eighth attachment portions SP4E to SP8E have substantially the same structure as that of the third attachment portion SP3E. Thus, they will not be described in detail here for the sake of brevity.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket assembly comprising:
    a first sprocket including a first sprocket body and a plurality of first sprocket teeth extending radially outwardly from the first sprocket body with respect to a rotational center axis of the bicycle rear sprocket assembly, the first sprocket body having at least one first recess;
    a second sprocket including a second sprocket body and a plurality of second sprocket teeth extending radially outwardly from the second sprocket body with respect to the rotational center axis; and
    a sprocket support configured to engage with a bicycle hub assembly, the sprocket support including a sprocket attachment part, the first sprocket and the second sprocket being attached to the sprocket attachment part, the sprocket attachment part being at least partly provided in the at least one first recess to transmit a rotational force between the first sprocket and the sprocket support,
    the at least one first recess including first recesses each having a first circumferential width defined in a circumferential direction with respect to the rotational center axis,
    the first recesses being spaced apart from each other in the circumferential direction at intervals of circumferential distances without another first recess between adjacent two of the first recesses,
    the first circumferential width being smaller than each of the circumferential distances, and the at least one first recess includes a first axial surface facing in an axial direction with respect to the rotational center axis.

2. The bicycle rear sprocket assembly according to claim 1, wherein
    the at least one first recess includes a first circumferential surface and a first additional circumferential surface spaced apart from the first circumferential surface in the circumferential direction with respect to the rotational center axis, and
    the sprocket attachment part is provided between the first circumferential surface and the first additional circumferential surface in the circumferential direction.

3. The bicycle rear sprocket assembly according to claim 2, wherein
    the at least one first recess includes a first axial surface facing in an axial direction with respect to the rotational center axis,
    the first axial surface is provided between the first circumferential surface and the first additional circumferential surface in the circumferential direction, and
    the sprocket attachment part at least partly faces the first axial surface in the axial direction.

4. The bicycle rear sprocket assembly according to claim 1, wherein
    at least one of the first sprocket and the second sprocket is attached to the sprocket attachment part by adhesive.

5. The bicycle rear sprocket assembly according to claim 1, wherein
    the sprocket support includes a hub engagement part configured to engage with the bicycle hub assembly,
    the sprocket attachment part includes a plurality of support arms extending radially outwardly from the hub engagement part, and
    the first sprocket and the second sprocket are attached to the plurality of support arms.

6. The bicycle rear sprocket assembly according to claim 5, wherein
    at least one arm of the plurality of support arms includes a first radial support surface and a first axial support surface,
    the first radial support surface faces radially outwardly,
    the first axial support surface faces in the axial direction, and
    the first sprocket is attached to at least one of the first radial support surface and the first axial support surface.

7. The bicycle rear sprocket assembly according to claim 6, wherein
    the first axial support surface is provided in the at least one first recess.

8. The bicycle rear sprocket assembly according to claim 6, wherein
    the at least one arm of the plurality of support arms includes a second radial support surface and a second axial support surface,
    the second radial support surface faces radially outwardly,
    the second axial support surface faces in the axial direction, and
    the second sprocket is attached to at least one of the second radial support surface and the second axial support surface.

9. The bicycle rear sprocket assembly according to claim 5, wherein
    at least one arm of the plurality of support arms includes a radially outer end provided in the at least one first recess.

10. The bicycle rear sprocket assembly according to claim 1, wherein
    the sprocket support includes a first radial support surface and a first axial support surface,
    the first radial support surface faces radially outwardly,
    the first axial support surface faces in the axial direction, and the first sprocket is attached to at least one of the first radial support surface and the first axial support surface.

11. The bicycle rear sprocket assembly according to claim 1, wherein
the first sprocket is made of a first metallic material.

12. The bicycle rear sprocket assembly according to claim 11, wherein
the first metallic material includes aluminum.

13. The bicycle rear sprocket assembly according to claim 1, wherein
the first sprocket has a first pitch-circle diameter,
the second sprocket has a second pitch-circle diameter, and
the first pitch-circle diameter is larger than the second pitch-circle diameter.

14. The bicycle rear sprocket assembly according to claim 13, wherein
the first pitch-circle diameter is the largest pitch-circle diameter in the bicycle rear sprocket assembly.

15. The bicycle rear sprocket assembly according to claim 1, wherein
the sprocket support includes a hub engagement part configured to engage with the bicycle hub assembly, and
the hub engagement part includes an internal spline.

16. The bicycle rear sprocket assembly according to claim 1, further comprising:
a third sprocket including a third sprocket body and a plurality of third sprocket teeth extending radially outwardly from the third sprocket body with respect to the rotational center axis; and
a fourth sprocket including a fourth sprocket body and a plurality of fourth sprocket teeth extending radially outwardly from the fourth sprocket body with respect to the rotational center axis.

17. The bicycle rear sprocket assembly according to claim 16, wherein
the third sprocket and the fourth sprocket are attached to the sprocket attachment part.

18. The bicycle rear sprocket assembly according to claim 1, wherein
the first sprocket is adjacent to the second sprocket without another sprocket between the first sprocket and the second sprocket in an axial direction with respect to the rotational center axis.

19. The bicycle rear sprocket assembly according to claim 1, wherein
the second sprocket body has at least one second recess, and
the sprocket attachment part is at least partly provided in the at least one second recess.

20. The bicycle rear sprocket assembly according to claim 1, wherein
the first sprocket body includes a first support attachment part having the at least one first recess,
the first support attachment part has a first axial thickness defined in an axial direction with respect to the rotational center axis,
the at least one first recess has a first axial depth defined in the axial direction, and
the first axial thickness is larger than the first axial depth.

21. The bicycle rear sprocket assembly according to claim 1, wherein
the sprocket support includes a hub engagement part configured to engage with the bicycle hub assembly,
the sprocket attachment part includes a plurality of support arms extending radially outwardly from the hub engagement part,
at least one arm of the plurality of support arms includes a first wall, a second wall, and an attachment wall,
the first wall is spaced apart from the second wall in a circumferential direction with respect to the rotational center axis,
the first wall and the second wall extends from the attachment wall in an axial direction with respect to the rotational center axis, and
the first sprocket and the second sprocket are attached to the attachment wall.

22. The bicycle rear sprocket assembly according to claim 21, wherein
the first wall includes a first reinforcement part having at least one of a first maximum circumferential thickness defined in the circumferential direction and a first maximum axial thickness defined in the axial direction.

23. The bicycle rear sprocket assembly according to claim 22, wherein
the first reinforcement part is provided closer to an axial end of the first wall than the attachment wall in the axial direction.

24. The bicycle rear sprocket assembly according to claim 23, wherein
at least one of the first maximum circumferential thickness and the first maximum axial thickness is defined at an axially end part of the first reinforcement part.

25. The bicycle rear sprocket assembly according to claim 22, wherein
the first reinforcement part is provided radially closer to the hub engagement part than a radially outer end of the at least one arm of the plurality of support arms.

26. The bicycle rear sprocket assembly according to claim 25, wherein
the at least one of first maximum circumferential thickness and the first maximum axial thickness is defined at a radially inner part of the first reinforcement part.

27. The bicycle rear sprocket assembly according to claim 1, wherein
the plurality of first sprocket teeth is arranged at a tooth pitch in a circumferential direction with respect to the rotational center axis, and
the first circumferential width is larger than the tooth pitch.

28. The bicycle rear sprocket assembly according to claim 1, wherein
each of the first recesses includes a first circumferential surface and a first additional circumferential surface spaced apart from the first circumferential surface in the circumferential direction, and
the first circumferential width is defined between the first circumferential surface and the first additional circumferential surface in the circumferential direction.

29. A bicycle rear sprocket assembly comprising:
a first sprocket including a first sprocket body and a plurality of first sprocket teeth extending radially outwardly from the first sprocket body with respect to a rotational center axis of the bicycle rear sprocket assembly, the first sprocket body having at least one first recess;
a second sprocket including a second sprocket body and a plurality of second sprocket teeth extending radially outwardly from the second sprocket body with respect to the rotational center axis; and a sprocket support configured to engage with a bicycle hub assembly, the sprocket support including a sprocket attachment part, the first sprocket and the second sprocket being attached to the sprocket attachment part, the sprocket attachment part being at least partly provided in the at least one first recess to transmit a rotational force between the first sprocket and the sprocket support, the at least one first recess including a first circumferential surface and a first additional circumferential surface spaced apart from the first circumferential surface in a circumferential direction with respect to the rotational center axis, the sprocket attachment part being provided between the first circumferential surface and the first additional circumferential surface in the circumferential direction, the first circumferential surface and the first additional circumferential surface face toward each other in the circumferential direction, and the at least one first recess includes a first axial surface facing in an axial direction with respect to the rotational center axis.

30. The bicycle rear sprocket assembly according to claim 29, wherein the sprocket attachment part includes a radially outer end provided between the first circumferential surface and the first additional circumferential surface in the circumferential direction.

* * * * *